(12) United States Patent
Kashibuchi et al.

(10) Patent No.: US 8,094,342 B2
(45) Date of Patent: Jan. 10, 2012

(54) IMAGE PROCESSING DEVICE THAT RETAINS A HIGH RESOLUTION DITHERING MATRIX AND IMAGE PROCESSING METHOD THEREFOR

(75) Inventors: Yoichi Kashibuchi, Tokyo (JP); Hiroshi Kaburagi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 454 days.

(21) Appl. No.: 12/363,670

(22) Filed: Jan. 30, 2009

(65) Prior Publication Data

US 2009/0195835 A1 Aug. 6, 2009

(30) Foreign Application Priority Data

Feb. 6, 2008 (JP) ................... 2008-026710

(51) Int. Cl.
*H04N 1/40* (2006.01)
*G06K 9/32* (2006.01)
(52) U.S. Cl. ...................... 358/3.01; 382/299
(58) Field of Classification Search .................. None
See application file for complete search history.

(56) References Cited

U.S. PATENT DOCUMENTS

| 4,771,279 | A * | 9/1988 | Hannah ............ 345/559 |
| 5,777,759 | A | 7/1998 | Kaburagi |
| 5,926,582 | A * | 7/1999 | Kakutani ........... 382/299 |
| 6,519,366 | B1 | 2/2003 | Kaburagi |
| 6,668,100 | B1 | 12/2003 | Kaburagi |
| 2004/0227965 | A1 * | 11/2004 | Nakajima .......... 358/1.9 |
| 2006/0209317 | A1 | 9/2006 | Shoda |

FOREIGN PATENT DOCUMENTS

| JP | 2000-332995 | 11/2000 |
| JP | 2004-255700 | 9/2004 |
| JP | 2005-094404 | 4/2005 |
| JP | 2005-64954 | 10/2005 |

OTHER PUBLICATIONS

English Translation JP 2005 064954 cited in IDS.*
English Translation JP 2005 094404 cited in IDS.*
Chinese Office Action dated Jun. 17, 2010 issued during prosecution of related Chinese application No. 200910003883.0.
European Search Report dated Sep. 3, 2010 issued during prosecution of related European application No. 09152150.0.
Korean Office Action dated Sep. 29, 2010 issued during prosecution of related Korean application No. 10-2009-00009572 (whole English-language translation included).

* cited by examiner

*Primary Examiner* — Twyler Haskins
*Assistant Examiner* — Christopher D Wait
(74) *Attorney, Agent, or Firm* — Fitzpatrick, Cella, Harper & Scinto

(57) ABSTRACT

A device capable of providing an image quality that is close to a high resolution printing engine unit by low resolution printing engine unit. It includes a processing unit for comparing thresholds included in a high resolution dithering matrix with a pixel value included in each pixel of a low resolution input image and for outputting multi-level gray scale signal values. In addition, the processing unit includes a comparing unit for comparing a pixel value of each pixel of the low resolution input image with a plurality of thresholds included in the high resolution dithering matrix; an integrating unit for obtaining for each pixel the multi-level gray scale signal value by integrating a plurality of comparison results obtained for each pixel; and an output unit for outputting the multi-level gray scale signal values obtained by the integrating unit.

5 Claims, 27 Drawing Sheets

NUMBER OF SCREEN LINES: 130.16lpi
SCREEN ANGLE: 12.53°

|  |  |  |  |  |  |  | 31 | 18 |
|---|---|---|---|---|---|---|---|---|
|  |  |  |  |  |  |  | 64 | 40 |
| 49 | 98 | 159 | 223 | 211 | 199 | 162 | 18 | 89 |
| 77 | 147 | 196 | 236 | 254 | 239 | 226 | 190 | 119 |
| 113 | 171 | 208 | 242 | 251 | 248 | 214 | 177 | 107 |
| 125 | 184 | 220 | 233 | 245 | 230 | 202 | 153 | 70 |
| 83 | 132 | 156 | 193 | 205 | 217 | 165 | 104 | 55 |
| 34 | 58 | 95 | 144 | 168 | 181 | 141 | 67 | 34 |
| 12 | 24 | 46 | 73 | 110 | 122 | 92 | 43 | 21 |
| 6 | 9 | 15 | 37 | 86 | 129 | 116 | 80 | 52 |
| 0 | 3 | 28 | 61 | 135 | 187 | 174 | 150 | 101 |

| INDEX | 1 | 2 | 3 | 4 | 5 | 6 | 7 | 8 | 9 |
|---|---|---|---|---|---|---|---|---|---|
| WEIGHT COEFFICIENT C | 1 | 2 | 1 | 2 | 3 | 2 | 1 | 2 | 1 |

|    | 6   | 7   | 8   | 9   | 10  | 11  | 12  | 13  | 14  | 15  | 16  | 17  |
|----|-----|-----|-----|-----|-----|-----|-----|-----|-----|-----|-----|-----|
| 2  | 251 | 248 | 214 | 177 | 107 | 83  | 132 | 156 | 193 | 205 | 217 | 165 |
| 3  | 245 | 230 | 202 | 153 | 70  | 34  | 58  | 95  | 144 | 168 | 181 | 141 |
| 4  | 205 | 217 | 165 | 104 | 55  | 12  | 24  | 46  | 73  | 110 | 122 | 92  |
| 5  | 168 | 181 | 141 | 67  | 34  | 6   | 9   | 15  | 37  | 86  | 129 | 116 |
| 6  | 110 | 122 | 92  | 43  | 21  | 0   | 3   | 28  | 61  | 135 | 187 | 174 |
| 7  | 86  | 129 | 116 | 80  | 52  | 31  | 18  | 49  | 98  | 159 | 223 | 211 |
| 8  | 135 | 187 | 174 | 150 | 101 | 64  | 40  | 70  | 147 | 196 | 236 | 254 |
| 9  | 159 | 223 | 211 | 199 | 162 | 138 | 89  | 113 | 171 | 208 | 242 | 251 |
| 10 | 196 | 236 | 254 | 239 | 226 | 190 | 119 | 125 | 184 | 220 | 233 | 245 |
| 11 | 208 | 242 | 251 | 248 | 214 | 177 | 107 | 83  | 132 | 156 | 193 | 205 |
| 12 | 220 | 233 | 245 | 230 | 202 | 153 | 70  | 34  | 58  | 95  | 144 | 168 |
| 13 | 156 | 193 | 205 | 217 | 165 | 104 | 55  | 12  | 24  | 46  | 73  | 110 |

FIG.10B

|     | 6   | 7   | 8   | 9   | 10  | 11  | 12  | 13  | 14  | 15  | 16  | 17  |
| --- | --- | --- | --- | --- | --- | --- | --- | --- | --- | --- | --- | --- |
| 2   | 251 | 248 | 214 | 177 | 107 | 83  | 132 | 156 | 193 | 205 | 217 | 165 |
| 3   | 245 | 230 | 202 | 153 | 70  | 34  | 58  | 95  | 144 | 168 | 181 | 141 |
| 4   | 205 | 217 | 165 | 104 | 55  | 12  | 24  | 46  | 73  | 110 | 122 | 92  |
| 5   | 168 | 181 | 141 | 67  | 34  | 6   | 9   | 15  | 37  | 86  | 129 | 116 |
| 6   | 110 | 122 | 92  | 43  | 21  | 0   | 3   | 28  | 61  | 135 | 187 | 174 |
| 7   | 86  | 129 | 116 | 80  | 52  | 31  | 18  | 49  | 98  | 159 | 223 | 211 |
| 8   | 135 | 187 | 174 | 150 | 101 | 64  | 40  | 70  | 147 | 196 | 236 | 254 |
| 9   | 159 | 223 | 211 | 199 | 162 | 138 | 89  | 113 | 171 | 208 | 242 | 251 |
| 10  | 196 | 236 | 254 | 239 | 226 | 190 | 119 | 125 | 184 | 220 | 233 | 245 |
| 11  | 208 | 242 | 251 | 248 | 214 | 177 | 107 | 83  | 132 | 156 | 193 | 205 |
| 12  | 220 | 233 | 245 | 230 | 202 | 153 | 70  | 34  | 58  | 95  | 144 | 168 |
| 13  | 156 | 193 | 205 | 217 | 165 | 104 | 55  | 12  | 24  | 46  | 73  | 110 |

|  | 6 | 7 | 8 | 9 | 10 | 11 | 12 | 13 | 14 | 15 | 16 | 17 |
|---|---|---|---|---|---|---|---|---|---|---|---|---|
| 2 | 251 | 248 | 214 | 177 | 107 | 83 | 132 | 156 | 193 | 205 | 217 | 165 |
| 3 | 245 | 230 | 202 | 153 | 70 | 34 | 58 | 95 | 144 | 168 | 181 | 141 |
| 4 | 205 | 217 | 165 | 104 | 55 | 12 | 24 | 46 | 73 | 110 | 122 | 92 |
| 5 | 168 | 181 | 141 | 67 | 34 | 6 | 9 | 15 | 37 | 86 | 129 | 116 |
| 6 | 110 | 122 | 92 | 43 | 21 | 0 | 3 | 28 | 61 | 135 | 187 | 174 |
| 7 | 86 | 129 | 116 | 80 | 52 | 31 | 18 | 49 | 98 | 159 | 223 | 211 |
| 8 | 135 | 187 | 174 | 150 | 101 | 64 | 40 | 70 | 147 | 196 | 236 | 254 |
| 9 | 159 | 223 | 211 | 199 | 162 | 138 | 89 | 113 | 171 | 208 | 242 | 251 |
| 10 | 196 | 236 | 254 | 239 | 226 | 190 | 119 | 125 | 184 | 220 | 233 | 245 |
| 11 | 208 | 242 | 251 | 248 | 214 | 177 | 107 | 83 | 132 | 156 | 193 | 205 |
| 12 | 220 | 233 | 245 | 230 | 202 | 153 | 70 | 34 | 58 | 95 | 144 | 168 |
| 13 | 156 | 193 | 205 | 217 | 165 | 104 | 55 | 12 | 24 | 46 | 73 | 110 |

IMAGE PROCESSING DEVICE THAT RETAINS A HIGH RESOLUTION DITHERING MATRIX AND IMAGE PROCESSING METHOD THEREFOR

BACKGROUND OF THE INVENTION

1. Field of the Invention

The present invention relates to an image processing device and an image processing method relating to screen processing for generating a multilevel halftone image for forming halftone dots in accordance with an input multi-level gray scale image.

2. Description of Related Art

A known technique forms a 1200-DPI binary image by comparing each pixel of a 600-DPI multilevel image with four thresholds, and prints the image by use of a printing engine unit with a printing resolution of 1200 DPI (see Japanese Patent Laid-Open No. 2005-064954, for example).

However, when receiving a 600-DPI multilevel image and printing the image with an engine unit having a 600-DPI printing resolution, the same image quality cannot be achieved as when printing with a printing engine unit having a 1200-DPI printing resolution.

SUMMARY OF THE INVENTION

The present invention provides an image processing device and method for achieving an image quality close to that of a high resolution printing engine unit, but by us of a low resolution printing engine unit.

An image processing device in accordance with the present invention retains a high resolution dithering matrix, and comprises a processing unit configured to compare thresholds included in the high resolution dithering matrix with a pixel value included in each pixel of a low resolution input image, and to output multi-level gray scale signal values.

An image processing device in accordance with the present invention reduces gray levels of an image, and comprises a comparing unit configured to compare a pixel value of each pixel included in the image with a plurality of thresholds included in a threshold arrangement to reduce the levels of gray of the image, wherein part of the plurality of thresholds compared with the pixel value of a first pixel of the pixels agrees with part of the plurality of thresholds compared with the pixel value of a second pixel of the pixels.

An image processing device in accordance with the present invention comprises a comparing unit configured to compare a pixel value of each pixel included in an image with a plurality of thresholds included in a threshold arrangement; and a component configured to obtain a pixel value of each pixel by multiplying a plurality of comparison results from the comparing unit by coefficients, and by summing up the multiplied results, wherein an average value of the coefficients multiplied with the respective comparison results is not less than one.

An image processing method in accordance with the present invention executes dithering processing in an image processing device retaining a high resolution dithering matrix, and comprises a step of outputting multi-level gray scale signal values by comparing thresholds included in the high resolution dithering matrix with a pixel value included in each pixel of a low resolution input image.

According to the present invention, a low resolution printing engine unit can achieve an image quality close to that of a high resolution printing engine unit at low cost.

Further features of the present invention will become apparent from the following description of exemplary embodiments (with reference to the attached drawings).

BRIEF DESCRIPTION OF THE DRAWINGS

FIG. 7 is an example of a halftone dot cell according to the rational tangent method;
FIG. 8 is an example of a weight coefficient table;
FIGS. 10A and 10B are diagrams showing relationships between a pixel and thresholds in the first embodiment;
FIGS. 11A and 11B are diagrams showing relationships between a pixel and thresholds in the first embodiment;
FIGS. 12A and 12B are diagrams showing relationships between a pixel and thresholds in the first embodiment.

DESCRIPTION OF THE EMBODIMENTS

The preferred embodiments in accordance with the invention will now be described in detail with reference to the accompanying drawings. However, components described in the embodiments are only examples, and it is not the intention to limit the scope of the present invention to these components.

Embodiment 1

In the following, a first embodiment in accordance with the present invention will be described in detail with reference to the accompanying drawings.

Figure 1:
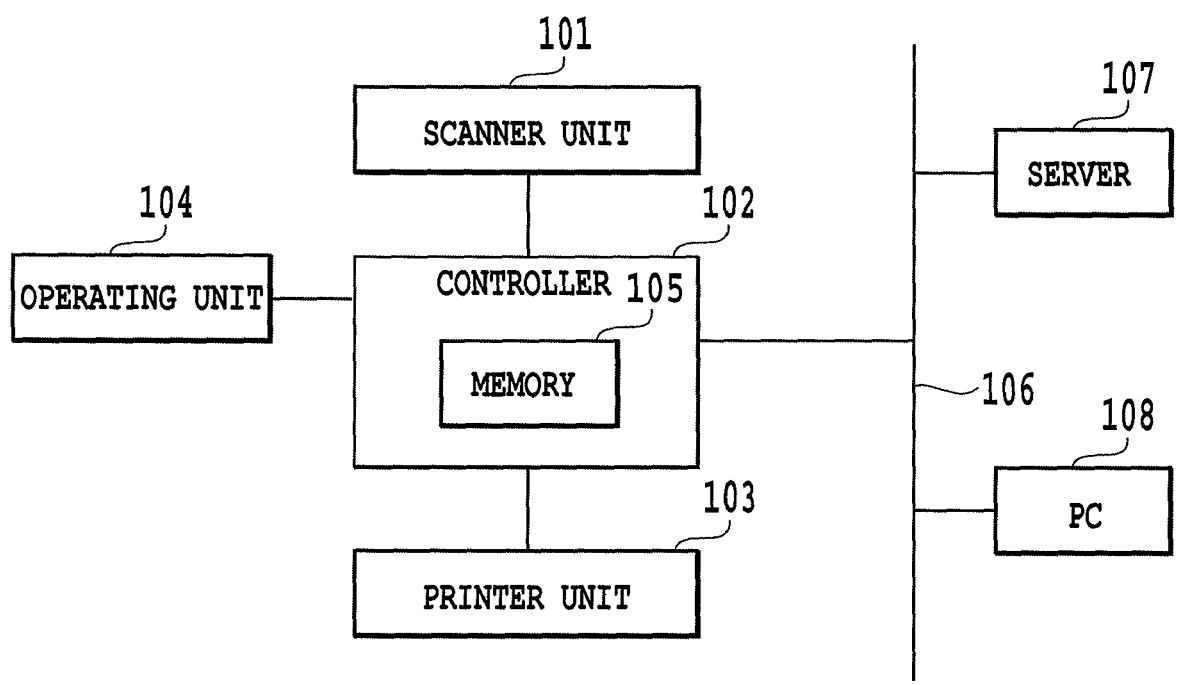
FIG. 1 is a schematic diagram of an image forming device.

FIG. 1 is a schematic block diagram of a system comprising an image forming device (a digital multifunction machine such as COPY/PRINT/FAX, for example) to which the present invention is applicable, a server and a PC connected to the image forming device.

The image forming device of the present embodiment includes a scanner unit 101 for carrying out original document reading processing, and a controller 102 for performing image processing of an image read by the scanner unit 101 and for storing the image in a memory 105. In addition, the device includes an operating unit 104 for a user to set various printing requirements for the image read by the scanner unit 101.

Furthermore, the device includes a printer unit 103 and the like for forming a visualized image on recording paper from the image data read out from the memory 105 in accordance with printing requirements set via the operating unit 104. The image forming device is connected via a network 106 to a server 107 for managing image data and to a personal computer (PC) 108 for instructing the image forming device to perform printing.

Here, a detailed construction of a digital multifunction machine including general functions such as COPY/PRINT/FAX will be described with reference to FIG. 2 as an image forming device to which the present invention is applicable.

Figure 2:
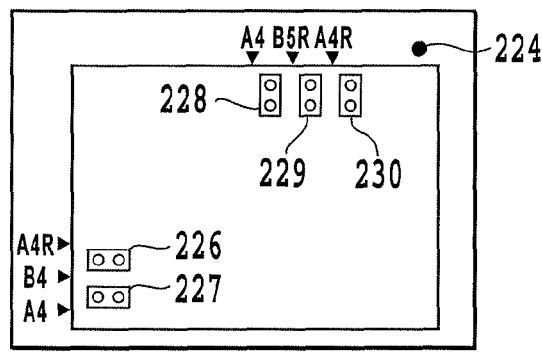
FIG. 2 is a cross-sectional view of the image forming device.
Figure 2:
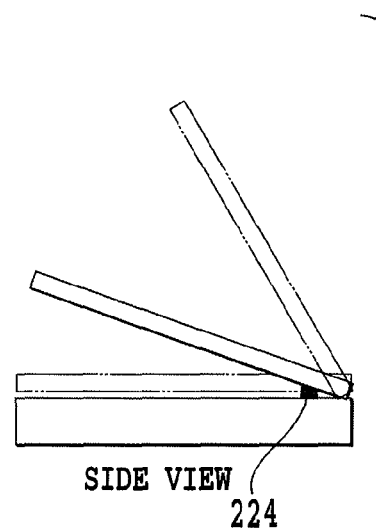
Figure 2:
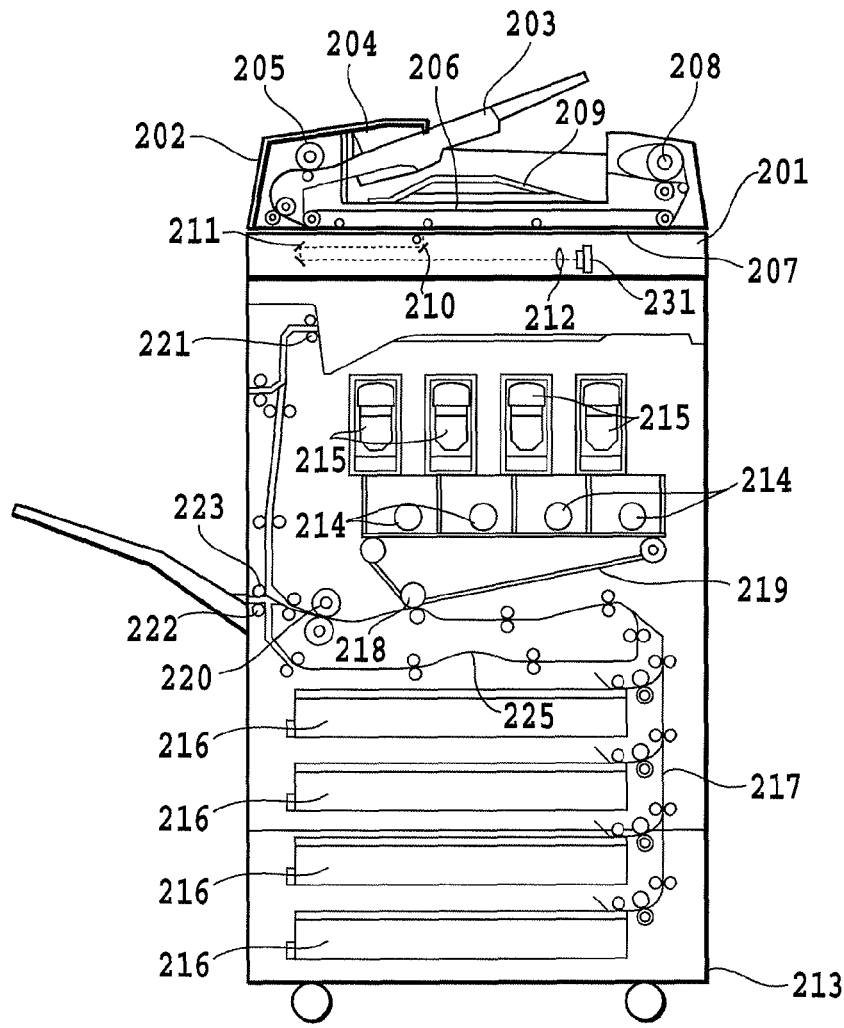

FIG. 2 is a cross-sectional view of a digital multifunction machine configured to perform general functions such as COPY/PRINT/FAX as an image forming device to which the present invention is applicable.

The image forming device has respective functions of copy/printer/fax. In FIG. 2, the image forming device of the present embodiment has a scanner 201, a document feeder (DF) 202, and a printer 213 with four color drums for printing.

First, the reading operation carried out mainly by the scanner 201 will be described.

When setting an original document to be read, the user places the original document on the document glass 207 and closes the DF 202. Then, an open-and-close sensor 224 detects that the document glass 207 is covered. After that, optical reflection type document size detecting sensors 226-230 mounted in the casing of the scanner 201 detect the document size. Using the size detection as a starting point, a light source 210 irradiates the original document, and a CCD (charge-coupled device) 231 receives the light reflected from the original document via a reflective plate 211 and a lens 212, and reads an image.

The controller 102 of the image forming device (FIG. 1) converts the image data read by the CCD 231 to a digital signal, carries out image processing for the scanner, and stores the image data in a memory 105 within the controller (FIG. 1).

When setting an original document on the DF 202 to be read, the user places the original document faceup on a tray of a document setting unit 203 of the DF 202. Then, a document sensor 204 detects that the original document is set. A document feed roller 205 and a conveyor belt 206 rotate and carry the original document so that the original document is set at a prescribed position on the document glass 207. After that, the image is read in the same manner as when the document is placed on the document glass 207, and the obtained image data to be printed is stored in the memory 105 in the controller 102.

After the reading has been completed, the conveyor belt 206 starts to rotate again to convey the original document toward the right side in the cross-sectional view of the image forming device of FIG. 2. Thus, the original document is ejected to a document output tray 209 via a conveyor roller 208 at a paper output side. When a plurality of original documents are present, the instant when the original document is fed from the document glass 207 to the right side in the cross-sectional view of the image forming device to be output, the next original document is fed from the left side in the cross-sectional view of the image forming device via a paper feed roller 205. Thus, the reading of the next original document is carried out successively. The foregoing is the operation of the scanner 201.

Next, the printing operation performed by the printer 213 will be described.

The image data to be printed, which is temporarily stored in the memory 105 in the controller 102, undergoes the image processing for printing in the controller 102 again, which will be described later, and is transferred to the printer 213. The printer 213 converts the image data to a pulse signal by PWM control within the printer unit 103, and a laser-recording unit converts the pulse signal to recording laser beams which use the four colors of yellow, magenta, cyan and black. Then, the recording laser beams are irradiated to photoconductive drums 214 of the respective colors, thereby forming electrostatic latent images on the photoconductive drums.

The printer 213 performs toner development on the photoconductive drums with toners supplied from toner cartridges 215 so that visualized toner images on the photoconductive drums undergo primary transfer to an intermediate transfer belt 219. The intermediate transfer belt 219 rotates clockwise in FIG. 3 so that the toner images are transferred from the intermediate transfer belt 219 onto recording paper when the recording paper fed from a paper cassette 216 arrives at a secondary transfer position 218 via a paper conveyor path 217.

The recording paper having the image transferred thereon undergoes toner fixing by pressure and heat by a fixing unit 220, is carried through a paper output conveyor path, and is output to a center tray 221 for facedown paper output or to a side tray 222 for faceup paper output. To switch between the paper output trays, a flapper 223 is provided for switching between the two conveyor paths. In addition, in the case of double-sided printing, after the recording paper has passed through the fixing unit 220, the flapper 223 switches the conveyor path in such a manner that the recording paper is sent downward by a switchback thereafter, and is fed to the secondary transfer position 218 again through a double-sided printing paper conveyor path 225. Thus, double-sided printing is performed.

Next, the foregoing image processing for printing will be described in detail with reference to FIG. 3.

Figure 3:
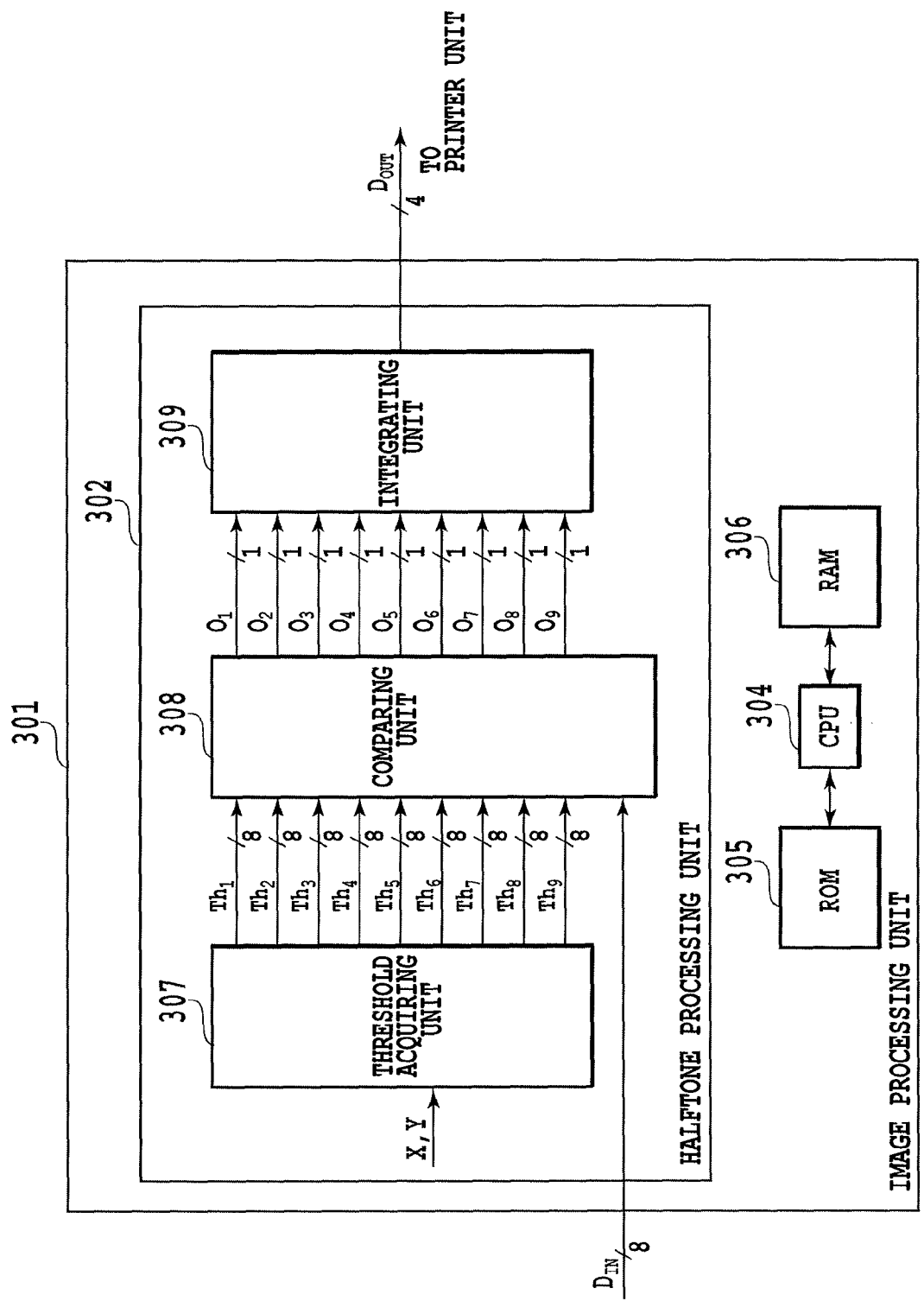
FIG. 3 is a block diagram showing image processing for printing.

FIG. 3 is a block diagram showing the image processing for printing.

In FIG. 3, the reference numeral 301 designates an image processing unit for performing the image processing in the controller 102. Here, the image data to be printed, which is temporarily stored in the memory 105 in the controller 102, is 8-bit deep data, and the image data to be printed supplied from the memory 105 undergo resolution-enhancing dithering processing by a halftone processing unit 302. The resolution-enhancing dithering processing converts the image data to be printed to 4-bit deep data, and then delivers to the printer unit 103.

The reference numeral 304 designates a CPU for controlling the whole operation of the image processing unit 301 according to a control program retained in a ROM 305. The reference numeral 306 designates a RAM, which is used as a work area of the CPU 304. The RAM 306 also stores a high resolution dithering matrix 601 (FIG. 6) created for the image data to be printed with a resolution of N times in the main scanning direction and M times in the subscanning direction, and a weight coefficient table 801 which will be described later.

A threshold acquiring unit 307 in the halftone processing unit 302 has a means for acquiring a plurality of thresholds consisting of step S401 and step S402 which will be described later. A comparing unit 308 has a comparing means for carrying out comparison with the plurality of thresholds at step S404, and an integrating unit 309 has an integrating means for integrating a plurality of comparing results at step S405, and an output means for outputting multi-level gray scale signal values. The details of the processing will be described later.

Next, the operation of the halftone processing unit 302 will be described in detail with reference to FIG. 3, FIG. 4, FIG. 6, FIG. 8 and FIG. 24.

Figure 4:
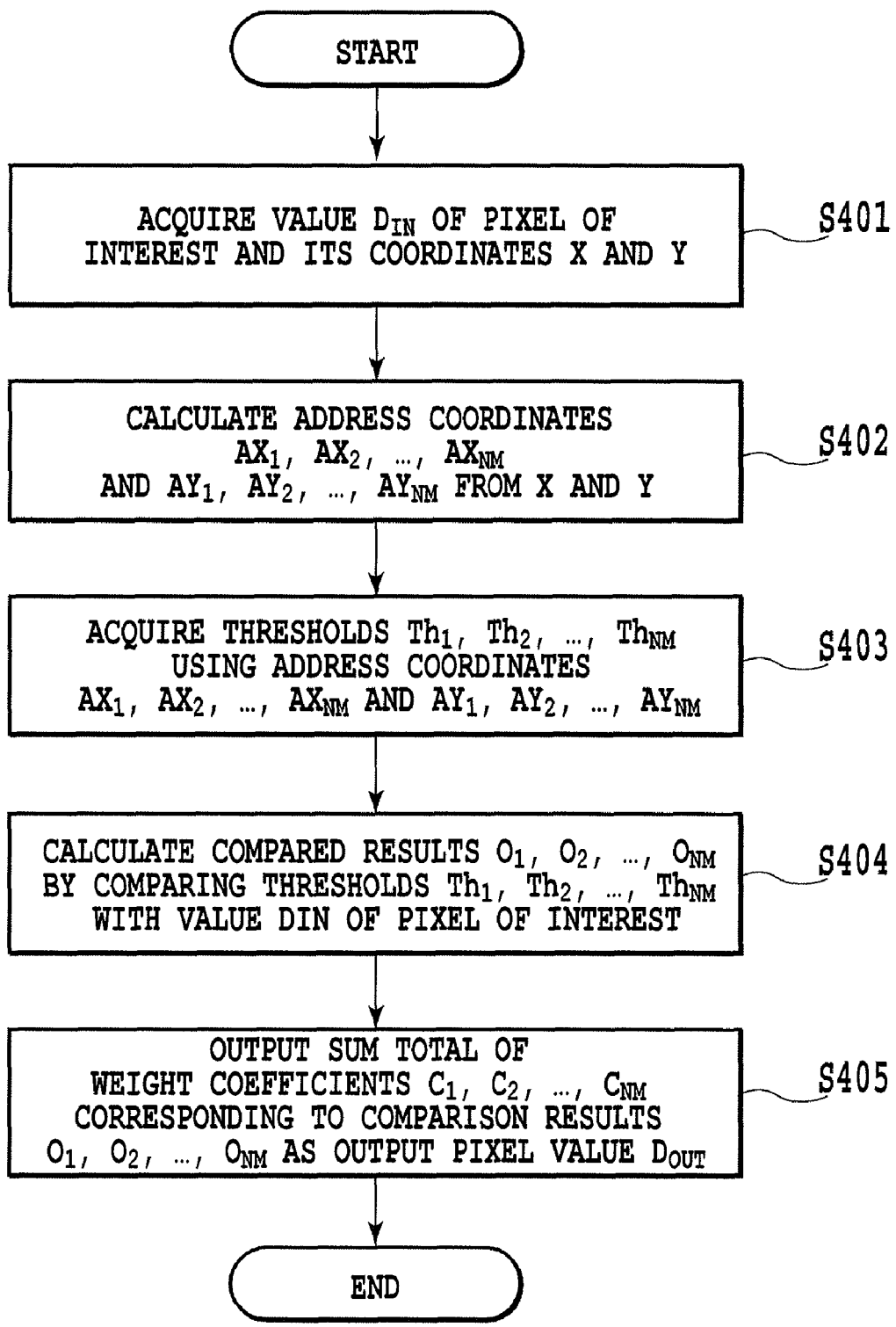
FIG. 4 is a flowchart of resolution-enhancing dithering processing of a first embodiment.
Figure 6:
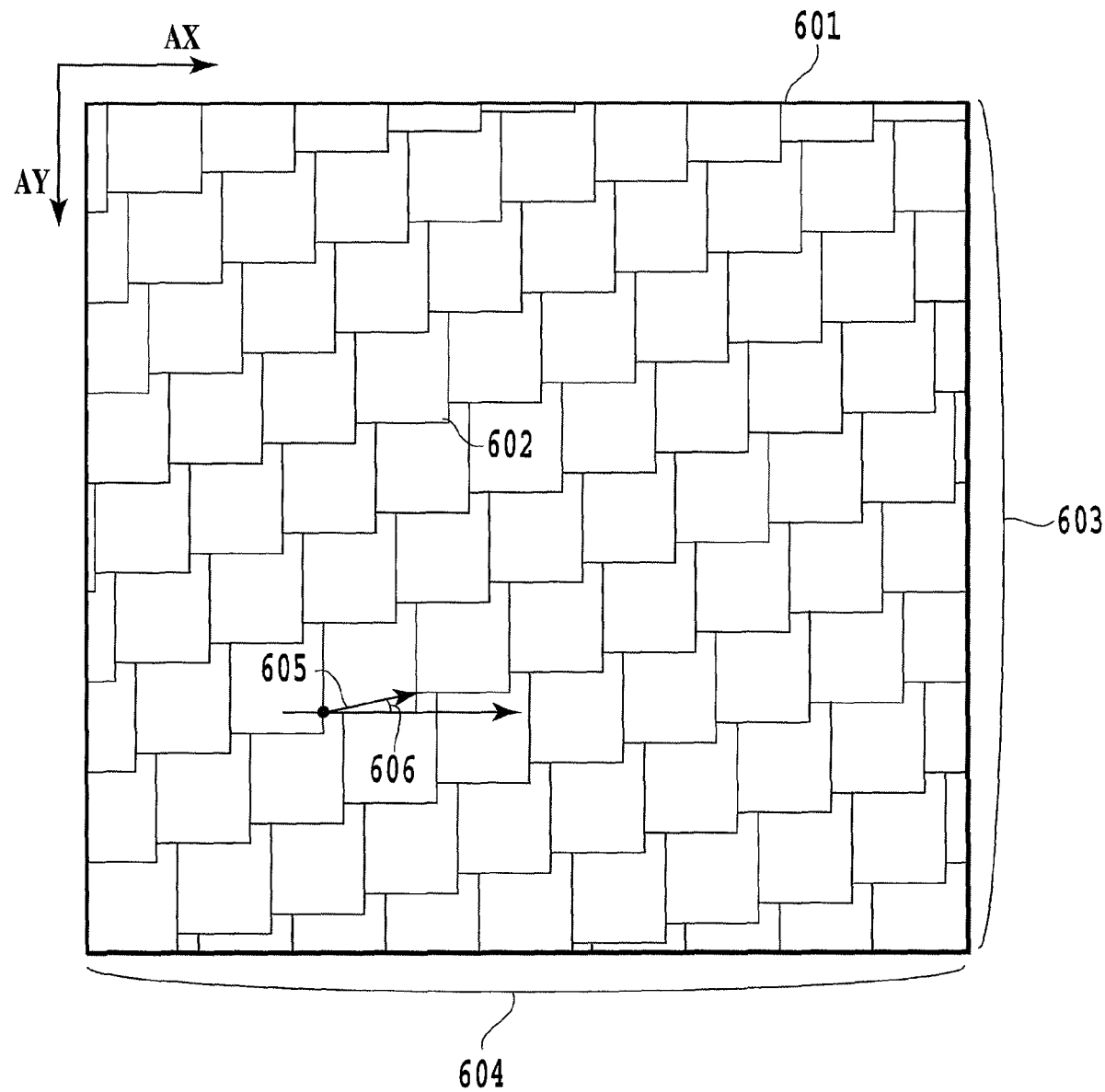
FIG. 6 is an example of a dithering matrix according to the rational tangent method.
Figure 8:
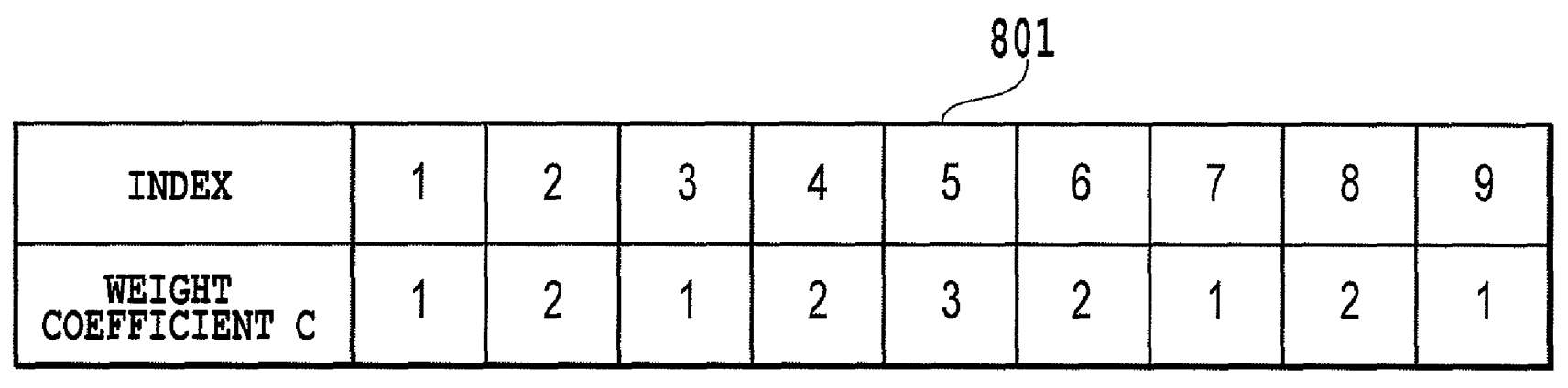

FIG. 4 is a flowchart showing the resolution-enhancing dithering processing method in the present embodiment. FIG. 6 is an example of a dithering matrix of the thresholds in the present embodiment. FIG. 8 is an example of a weight coefficient table which will be described later.

In the present embodiment, the dithering processing having a high resolution of N times in the main scanning direction and M times in the subscanning direction is applied to the image data to be printed without altering the real resolution of the image. In the following description, it is assumed that the resolution of the image data to be printed is 600 DPI, and the resolution of the dithering matrix to be applied is double (N=2 and M=2), that is, 1200 DPI.

As for the plurality of thresholds used in the threshold acquiring unit 307, although the details will be described later, some of the thresholds must be equal to some of the thresholds that are referred to when an adjacent neighboring pixel becomes a pixel of interest. Accordingly, a reference region of the thresholds, which will be described later, must overlap with a reference region of the adjacent neighborhood. Thus, the size of the reference region is (N+1) in the main scanning direction and (M+1) in the subscanning direction, and the number NM of the plurality of thresholds $Th_{NM}$ becomes ((N+1)×(M+1)). In addition, as for the comparison decision results $O_{NM}$ of the comparing unit 308 and the weight coefficients $C_{NM}$ of the integrating unit 309, which will be described later, the same number of thresholds is required in accordance with the plurality of thresholds. Since both N and M are two in the present embodiment, the following description is made under the assumption that the number NM is nine.

Next, the resolution-enhancing dithering processing of the halftone processing unit 302 will be described with reference to FIG. 24.

Figure 24:
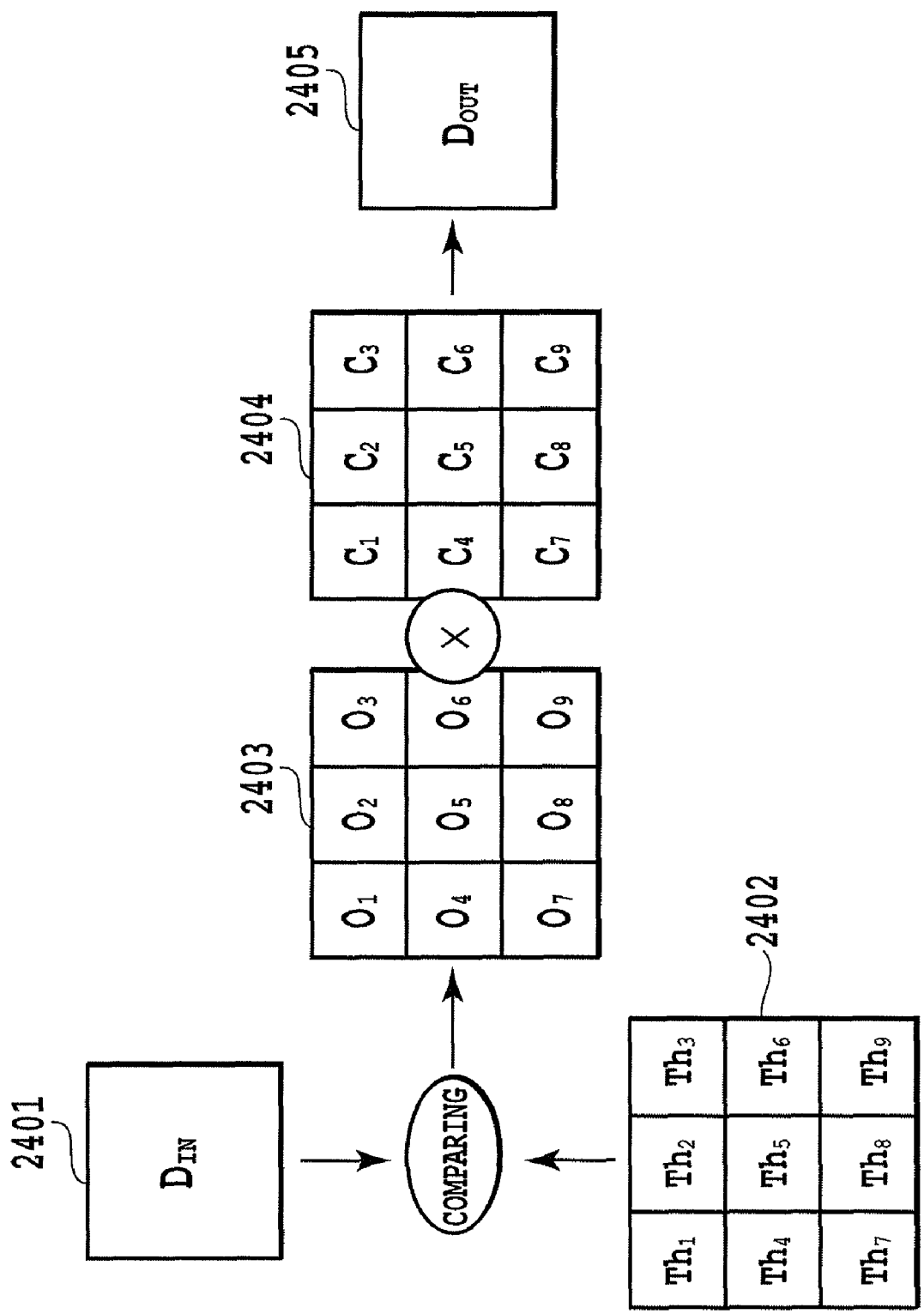
FIG. 24 is a diagram showing the resolution-enhancing dithering processing in accordance with the present invention.

FIG. 24 is a diagram schematically showing the resolution-enhancing dithering processing of the halftone processing unit 302 in the present embodiment.

First, at step S401, as for a pixel of interest 2401 (FIG. 24) supplied pixel by pixel from the image data to be printed to the halftone processing unit 302, its value $D_{IN}$, its coordinate X in the main scanning direction and its coordinate Y in the subscanning direction are acquired. Since the resolution of the print image data is 600 DPI, the maximum value of the coordinate X is about 7000 and the maximum value of the coordinate Y is about 5000 for A4 size (29.7 cm in the main scanning direction and 21 cm in the subscanning direction).

Next, at step S402, from the coordinate X and coordinate Y acquired at step S401, the threshold acquiring unit 307 obtains the nine address coordinates in the dithering matrix 601 (FIG. 6). The address coordinates are nine $AX_1$, $AX_2, \ldots, AX_{NM}$ in the main scanning direction and nine $AY_1$, $AY_2, \ldots, AY_{NM}$ in the subscanning direction. Since the number NM in the present embodiment is nine, the address coordinates in the main scanning direction are up to $AX_9$ and the address coordinates in the subscanning direction are up to $AY_9$. Details of a calculation method of the address coordinates will be described later.

Next, at step S403, from the address coordinates $AX_1$, $AX_2, \ldots, AX_{NM}$ and $AY_1, AY_2, \ldots, AY_{NM}$ of the dithering matrix obtained at step S402, the threshold acquiring unit 307 acquires $Th_1, Th_2, \ldots, Th_{NM}$ which constitute nine thresholds 2402. In the present embodiment, since the number NM of the thresholds is also nine, they are up to $Th_9$. Details of an acquiring method of the thresholds will be described later also.

Next, at step S404, the comparing unit 308 compares the value $D_{IN}$ of the pixel of interest 2401 acquired at step S401 with the nine thresholds 2402, $Th_1, Th_2, \ldots, Th_{NM}$, acquired at step S403, respectively. As a result of comparison, if the value of the pixel of interest is greater than the threshold, it assigns "1" and otherwise it assigns "0", thereby outputting comparison decision results 2403 consisting of $O_1, O_2, \ldots, O_{NM}$, each of which is one bit and corresponds to one of the nine thresholds. For example, the result of comparing $D_{IN}$ with $Th_1$ is output as $O_1$, and the result of comparing $D_{IN}$ with $Th_2$ is output as $O_2$.

Finally, at step S405, from the comparison results 2403 obtained at S404 and weight coefficients 2404 corresponding to the comparison results $O_1, O_2, \ldots, O_{NM}$, the integrating unit 309 obtains the value $D_{out}$ of an output pixel 2405 corresponding to the value $D_{IN}$ of the pixel of interest 2401, and outputs the value $D_{out}$ of an output pixel 2405. A calculation method of the value $D_{out}$ of the output pixel 2405 will be described later. The weight coefficients 2404, $C_1, C_2, \ldots, C_{NM}$, which correspond to $O_1, O_2, \ldots, O_{NM}$ of the comparison results 2403, respectively, are obtained from a weight coefficient table 801 of FIG. 8. The value $D_{out}$ of the output pixel 2405 is 4-bit deep data with a 16-step gray scale from 0 to 15.

The weight coefficient table 801 retains by associating an indices and the weight coefficients $C_i$ in advance. For example, assume that the ith comparison result is $O_i$. Then, the weight coefficient $C_i$ corresponding to $O_i$ can be obtained from the weight coefficient table 801 using i as an index. The output pixel value $D_{out}$ is obtained by acquiring, only when the comparison result $O_i$ is "1", the weight coefficient $C_i$ corresponding to it from the weight coefficient table 801 for i=0, 1, …, NM, and by summing up the weight coefficients $C_i$.

As described, the sum total of the weight coefficients $C_i$ of the weight coefficient table 801 becomes the maximum value of the output pixel value $D_{OUT}$. Thus, the sum total of the weight coefficients $C_i$ of the weight coefficient table 801 must be set at the maximum number of levels of gray of the output pixel value $D_{OUT}$ (that is, the gray-scale levels the printing engine unit can express). Accordingly, in the present embodiment, the sum total of the weight coefficients $C_i$ of the weight coefficient table 801 is set at 15 in advance.

Although the present embodiment obtains the value $D_{out}$ of the output pixel 2405 by adding the weight coefficients $C_i$ acquired from the weight coefficient table 801 in accordance with the values of the comparison results $O_i$, this is not essential. For example, the same result can be achieved by obtaining products of the comparison results $O_i$ and the weight coefficients $C_i$ at i=0, 1, …, NM, respectively, and the sum total of them.

Next, a calculation method of the dithering matrix and address coordinates and an acquiring method of the thresholds of the present embodiment will be described in detail with reference to FIG. 6, FIG. 7, FIG. 9, FIG. 10A, FIG. 10B, FIG. 11A, FIG. 11B, FIG. 12A and FIG. 12B.

FIG. 6 is an example of the dithering matrix of the thresholds designed for use at the resolution of 1200 DPI in the present embodiment as described before. The dithering matrix 601, which consists of a plurality of halftone dot cells 602, has a threshold on each lattice point indicated by the address coordinate AX in the main scanning direction and the address coordinate AY in the subscanning direction. The dithering matrix 601 has the halftone dot cells 602 arranged continuously and uniformly at the top and bottom edges and at the left and right edges.

Figure 9:
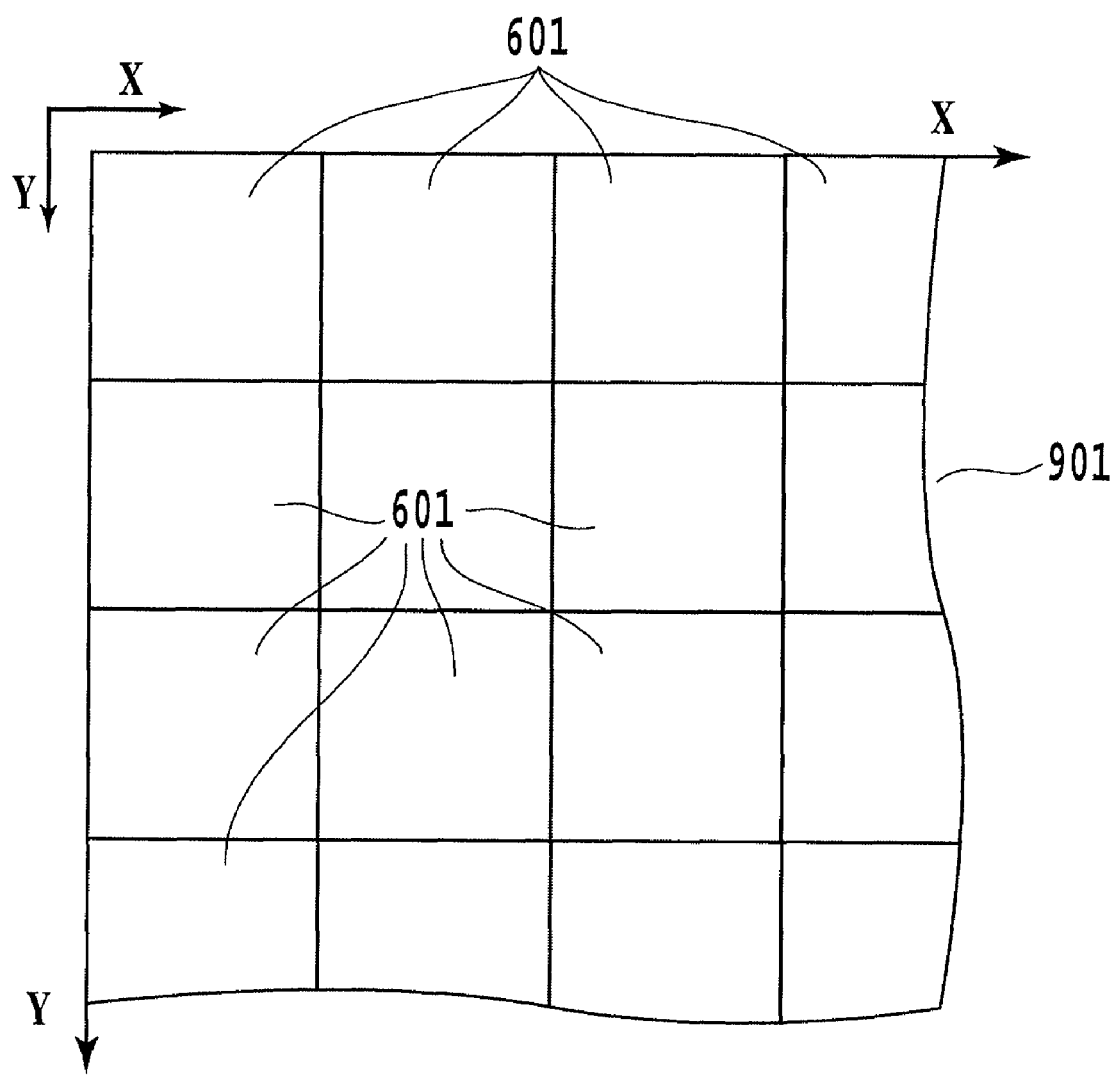
FIG. 9 is a diagram showing relationships between an image and a dithering matrix in the first embodiment.

FIG. 9 shows relationships between the image data to be printed 901 and the dithering matrices 601. As shown in FIG. 9, the dithering matrices 601 tile the coordinates X and coordinates Y of the image data 901 to be printed horizontally and vertically. In addition, FIG. 7 is an example of a halftone dot cell 602 constituting the dithering matrix 604 of FIG. 6. The halftone dot cell 602, which is an arrangement of the thresholds representing unit halftone dots, includes thresholds with a range of values corresponding to the bit depth of the image data 901 to be printed.

In the present embodiment, since the image data 901 to be printed is 8-bit deep and has values 0-255, the range of the threshold becomes 0-254. In addition, the width 604 of the dithering matrix 601 agrees with the number of the lattice points in the main scanning direction, and the height 603 of the dithering matrix 601 agrees with the number of the lattice points in the subscanning direction. As described, the dithering matrix 601 has one threshold on each lattice point. In the example of the dithering matrix 601 of FIG. 6, both the width 604 and height 603 are 85.

Compared with the image data to be printed having the 600-DPI resolution, the dithering matrix 601 is created with a double resolution of 1200 DPI in the main and subscanning directions as described above. The dithering matrix 601 can realize any given screen angle by providing the arrangement of the halftone dot cells 602 with an angle 606 as shown in FIG. 6. In addition, the spacing 605 of the halftone dot cells 602 shown in FIG. 6 forms the number of screen lines. The example of FIG. 6 has a 1200-DPI resolution, and the number of screen lines is about 130.16 lpi (lines per inch) and the screen angle is about 12.53 degrees.

Figure 5:
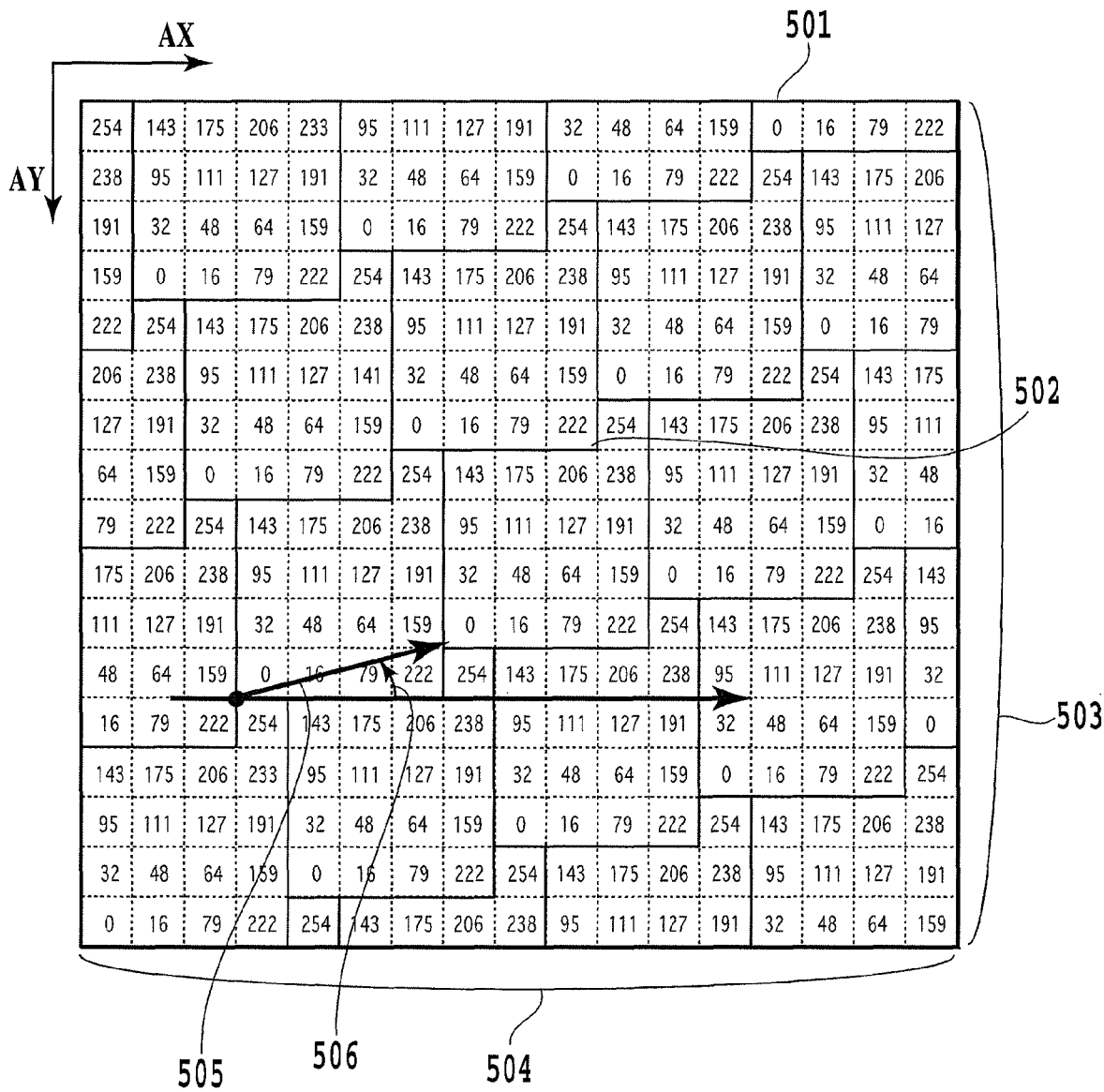
FIG. 5 is an example of a dithering matrix according to a rational tangent method.

FIG. 5 shows an example of the dithering matrix designed at a resolution of 600 DPI. The dithering matrix 501 has a 600-DPI resolution, and the number of screen lines is about 145.52 lpi (lines per inch) and the screen angle is about 14.04 degrees. Both FIG. 5 and FIG. 6 show an example of the dithering matrix designed in such a manner that the number of screen lines is about 130 lpi and the screen angle is about 15 degrees. Compared with the dithering matrix 501 with a lower resolution, it is found that the number of screen lines of the dithering matrix 601 is closer to 130 lpi.

Next, the calculation method of the address coordinates will be described.

The address coordinates $AX_1, AX_2, \ldots, AX_9$ and $AX_1, AX_2, \ldots, AY_9$ of the nine thresholds in the present embodiment are obtained by the following expression. In this case, it is assumed that the width 604 of the dithering matrix 601 is MW, and the height 603 is MH. The following MOD represents a function of a modulo operation, which returns the remainder left when the first argument is divided by the second argument.

$$AX_1 = MOD(X \times N-1, MW)$$

$$AX_2 = MOD(X \times N, MW)$$

$$AX_3 = MOD(X \times N+1, MW)$$

$$AX_4 = MOD(X \times N-1, MW)$$

$$AX_5 = MOD(X \times N, MW)$$

$$AX_6 = MOD(X \times N+1, MW)$$

$$AX_7 = MOD(X \times N-1, MW)$$

$$AX_8 = MOD(X \times N, MW)$$

$$AX_9 = MOD(X \times N+1, MW)$$

$$AY_1 = MOD(Y \times M-1, MH)$$

$$AY_2 = MOD(Y \times M-1, MH)$$

$$AY_3 = MOD(Y \times M-1, MH)$$

$$AY_4 = MOD(Y \times M, MH)$$

$$AY_5 = MOD(Y \times M, MH)$$

$$AY_6 = MOD(Y \times M, MH)$$

$$AY_7 = MOD(Y \times M+1, MH)$$

$$AY_8 = MOD(Y \times M+1, MH)$$

$$AY_9 = MOD(Y \times M+1, MH)$$

Here, relationships between the image data to be printed, the dithering matrix and the reference region described before will be described.

FIG. 10A, FIG. 10B, FIG. 11A, FIG. 11B, FIG. 12A and FIG. 12B are diagrams showing the relationships between the image data to be printed, the dithering matrix and the reference region.

Figure 10A:
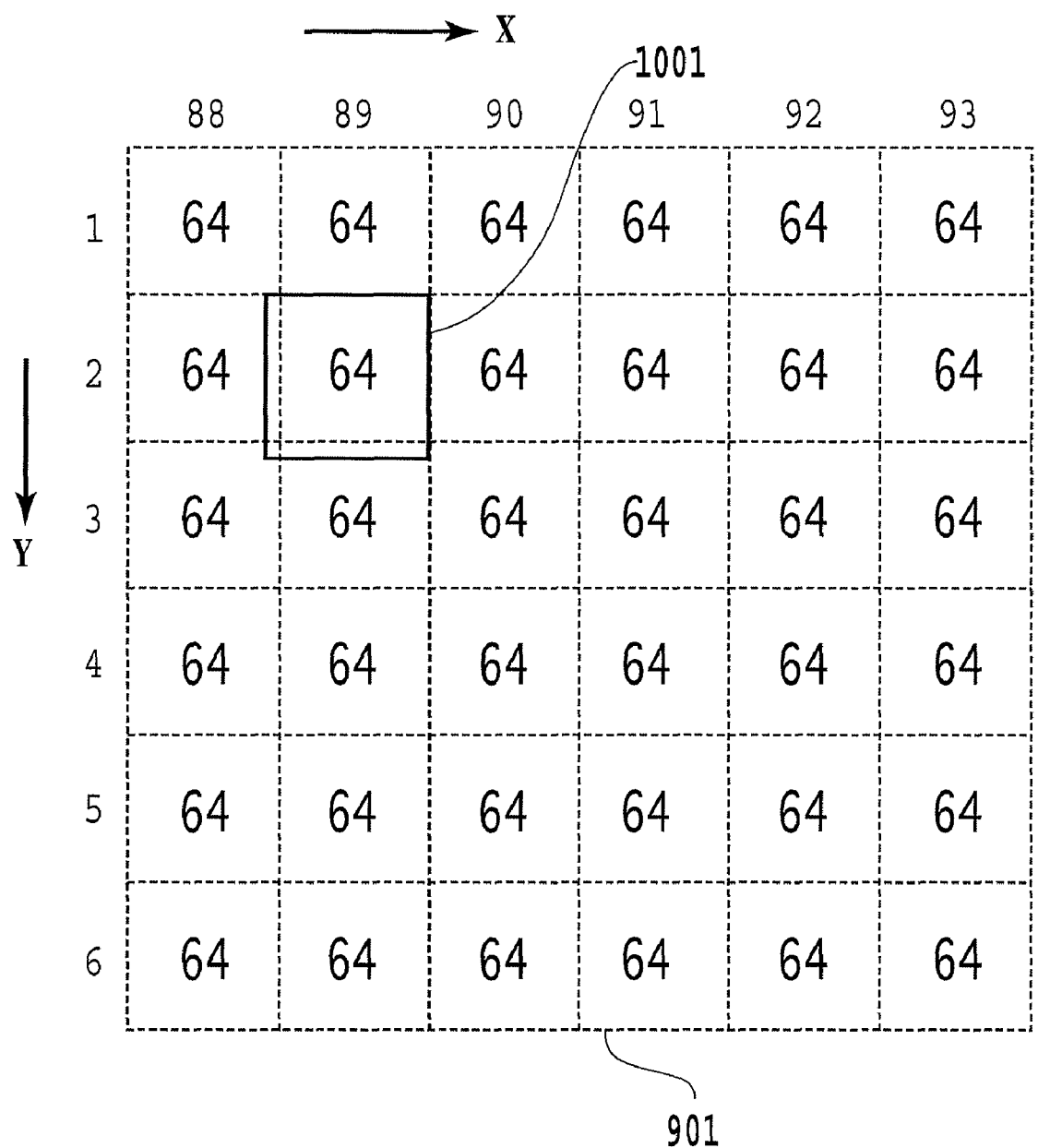

FIG. 10A and FIG. 10B show, when the coordinates in the image data to be printed 901 are (Y, X), the relationships between the pixel of interest with a value $D_{IN}$, which is placed at the coordinates (2, 89) of a pixel 1001 (first pixel), and the thresholds $Th_1, Th_2, \ldots, Th_9$ referred to at that time.

Assume that the coordinates in the dithering matrix 601 are (AY, AX). In this case, the coordinates of the thresholds $Th_1, Th_2, Th_3, Th_4, Th_5, Th_6, Th_7, Th_8$ and $Th_9$ are (3, 7), (3, 8), (3, 9), (4, 7), (4, 8), (4, 9), (5, 7), (5, 8) and (5, 9), respectively. It is found that the pixel 1001 with the coordinates (2, 89) is the pixel of interest with a value $D_{IN}$, and the NM thresholds on the dithering matrix 601 corresponding to the pixel 1001 are placed in the reference region 1003 of the thresholds, and its central threshold 1002 is the threshold $Th_5$ (165).

Figure 11A:
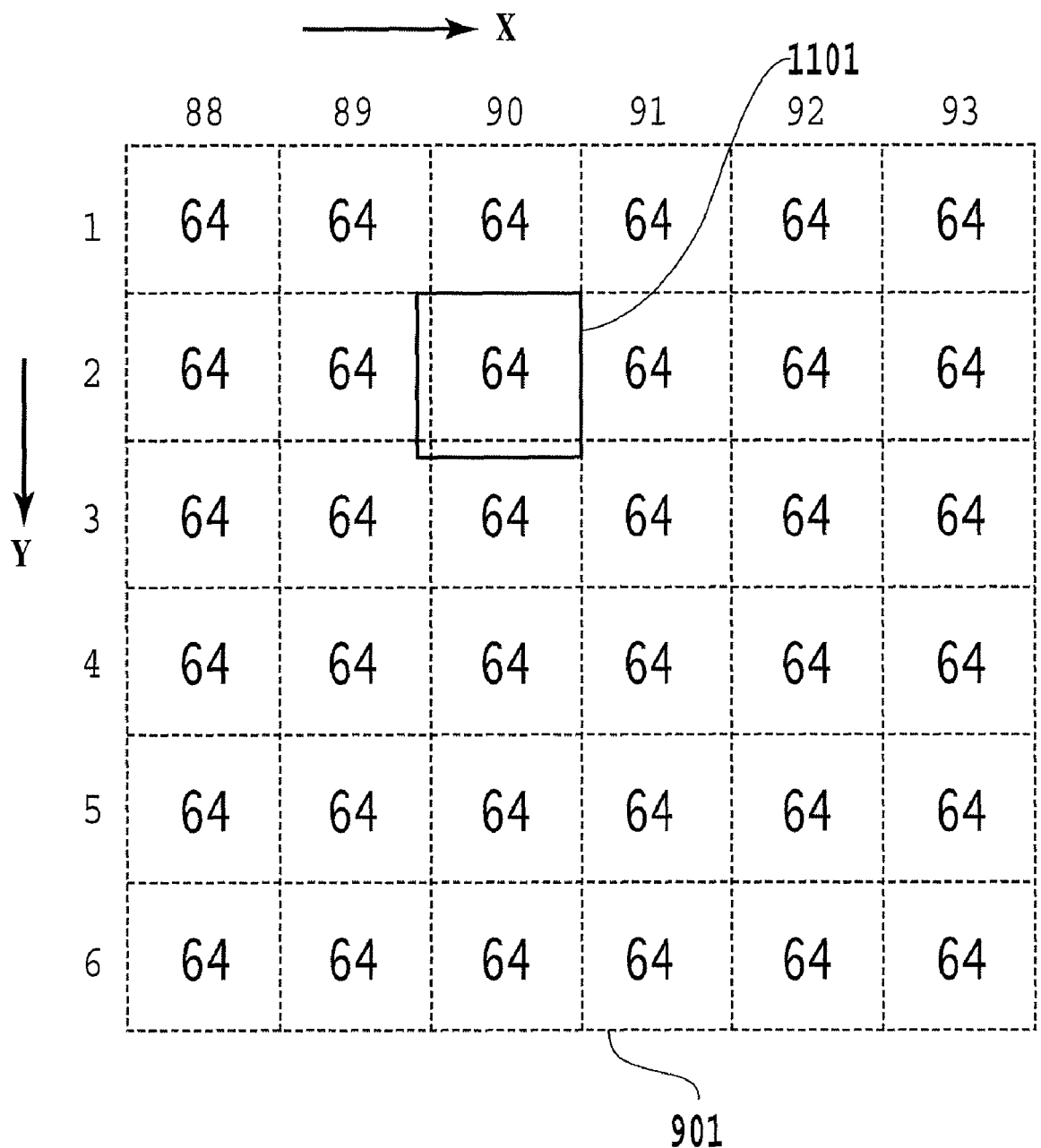

On the other hand, FIG. 11A and FIG. 11B show relationships between the pixel of interest with a value $D_{IN}$, which is placed at the coordinates (2, 90) of a pixel 1101 (second pixel), and the thresholds $Th_1, Th_2, \ldots, Th_9$ which are referred to at that time.

The pixel 1101 is a pixel at the coordinates one pixel forward from the pixel 1001 of FIG. 10A in the main scanning direction. In this case, the coordinates of the thresholds $Th_1, Th_2, Th_3, Th_4, Th_5, Th_6, Th_7, Th_8$ and $Th_9$ are (3, 9), (3, 10), (3, 11), (4, 9), (4, 10), (4, 11), (5, 9), (5, 10) and (5, 11), respectively. As can be seen from the coordinates, the reference region 1103 of the thresholds shares the thresholds at three coordinates (3, 9), (4, 9) and (5, 9) with the reference region 1003 of FIG. 10B.

Figure 12A:
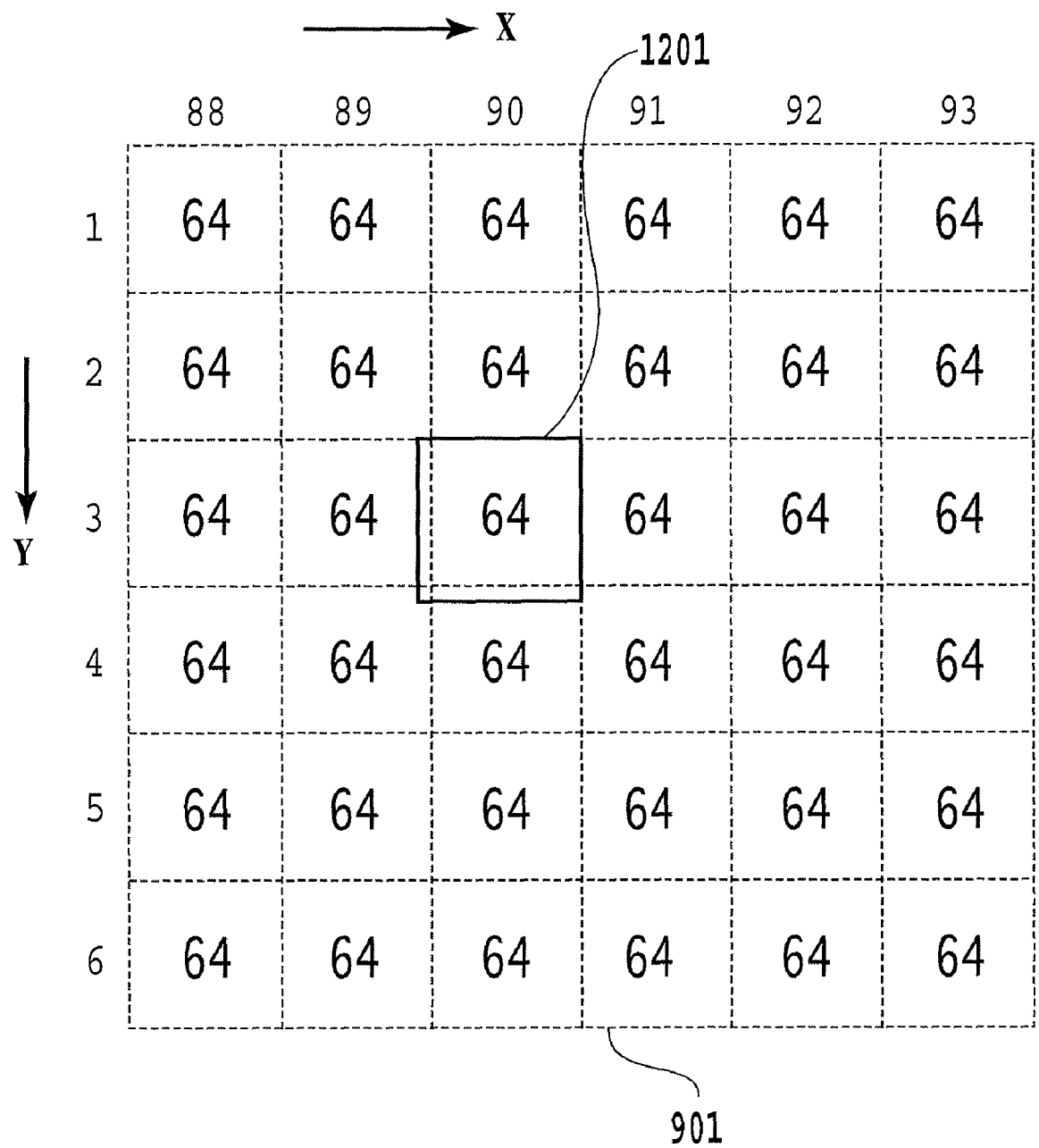

Likewise, FIG. 12A and FIG. 12B show relationships between the pixel of interest with a value $D_{IN}$, which is placed at the coordinates (3, 90) of a pixel 1201 (third pixel), and the thresholds $Th_1, Th_2, \ldots, Th_9$ which are referred to at that time.

The pixel 1201 is a pixel at the coordinates one pixel forward from the pixel 1001 of FIG. 10A in the subscanning direction. In this case, the coordinates of the thresholds $Th_1$, $Th_2, Th_3, Th_4, Th_5, Th_6, Th_7, Th_8$ and $Th_9$ are (5, 7), (5, 8), (5, 9), (6, 7), (6, 8), (6, 9), (7, 7), (7, 8) and (7, 9). In this case also, as can be seen from the coordinates, the reference region 1203 of the thresholds shares the thresholds at three coordinates (5, 7), (5, 8) and (5, 9) with the reference region 1003 of FIG. 10B, and shares one coordinate (5, 9) with the reference region 1103 of FIG. 11B.

As described above, the present embodiment employs the dithering matrix with the total of quadruple resolution (1200 dpi), that is, double the resolution in the main scanning and subscanning directions as compared with the image data to be printed with the resolution of 600 dpi, and compares the value $D_{IN}$ of the pixel of interest with each of the nine thresholds $Th_1$-$Th_9$. When each pixel of the image data to be printed 901 becomes the pixel of interest, the processing is carried out by using not all but some thresholds of the dithering matrix 601 referred to by the adjacent neighboring pixels, that is, by making repeated use of the thresholds. In addition, the comparison results $O_1$-$O_9$ between the value $D_{IN}$ of the pixel of interest and the nine thresholds $Th_1$-$Th_9$ are multiplied by the weight coefficient $C_1$-$C_9$ acquired from the weight coefficient table 801 to obtain the 16 (0-15) $D_{out}$(s) which are the value of the output pixel for the pixel of interest $D_{IN}$. In other words, the comparison results $O_{NM}$ are inflated using the weight coefficients to obtain the 16 (0-15) $D_{out}$(s). In this way, since thresholds $Th_{NM}$ are used repeatedly and the comparison results $O_{NM}$ are inflated in the present invention, it can reduce the memory capacity used as compared with the conventional multilevel dithering.

The halftone dot cell 602 constituting the dithering matrix 601 is constructed as shown in FIG. 7, for example. Accordingly, the thresholds of the dithering matrix 601 correspond to the addresses at which the thresholds contained in the halftone dot cell 602 is stored. Using the dithering matrix 601 makes it possible to realize the multilevel dithering method easily while maintaining the image quality at the same level as when performing the dithering processing by applying the conventional high resolution dithering matrix to a low resolution input image. In addition, the present embodiment applies a technique of using the dithering matrix 601 consisting of a repetition of a plurality of halftone dot cells 602. This makes it possible to construct the dithering matrix 601 from the thresholds of a single halftone dot cell 602, thereby being able to realize a memory-saving, low cost dithering method.

Although the reference regions 1003, 1103 and 1203 have three thresholds in the address coordinate AX direction and three thresholds in the AY direction in the present embodiment, these values are not so limited depending on the values N and M. For example, when both N and M are four, since the number NM becomes 25, the reference region has five thresholds in the address coordinate AX direction and five thresholds in the AY direction. In this case, the address coordinates $AX_1, AX_2, \ldots, AX_{25}$, and $AX_1, AX_2, \ldots, AY_{25}$ of the 25 thresholds are obtained by the following expression.

$AX_1 = \text{MOD}(X \times N - 2, MW)$ $AX_2 = \text{MOD}(X \times N - 1, MW)$ $AX_3 = \text{MOD}(X \times N, MW)$ $AX_4 = \text{MOD}(X \times N + 1, MW)$ $AX_5 = \text{MOD}(X \times N + 2, MW)$ $AX_6 = \text{MOD}(X \times N - 2, MW)$ $AX_7 = \text{MOD}(X \times N - 1, MW)$ $AX_8 = \text{MOD}(X \times N, MW)$ $AX_9 = \text{MOD}(X \times N + 1, MW)$ $AX_{10} = \text{MOD}(X \times N + 2, MW)$ $AX_{11} = \text{MOD}(X \times N - 2, MW)$ $AX_{12} = \text{MOD}(X \times N - 1, MW)$ $AX_{13} = \text{MOD}(X \times N, MW)$ $AX_{14} = \text{MOD}(X \times N + 1, MW)$ $AX_{15} = \text{MOD}(X \times N + 2, MW)$ $AX_{16} = \text{MOD}(X \times N - 2, MW)$ $AX_{17} = \text{MOD}(X \times N - 1, MW)$ $AX_{18} = \text{MOD}(X \times N, MW)$ $AX_{19} = \text{MOD}(X \times N + 1, MW)$ $AX_{20} = \text{MOD}(X \times N + 2, MW)$ $AX_{21} = \text{MOD}(X \times N - 2, MW)$ $AX_{22} = \text{MOD}(X \times N - 1, MW)$ $AX_{23} = \text{MOD}(X \times N, MW)$ $AX_{24} = \text{MOD}(X \times N + 1, MW)$ $AX_{25} = \text{MOD}(X \times N + 2, MW)$ $AY_1 = \text{MOD}(Y \times M - 2, MH)$ $AY_2 = \text{MOD}(Y \times M - 2, MH)$ $AY_3 = \text{MOD}(Y \times M - 2, MH)$ $AY_4 = \text{MOD}(Y \times M - 2, MH)$ $AY_5 = \text{MOD}(Y \times M - 2, MH)$ $AY_6 = \text{MOD}(Y \times M - 1, MH)$ $AY_7 = \text{MOD}(Y \times M - 1, MH)$ $AY_8 = \text{MOD}(Y \times M - 1, MH)$ $AY_9 = \text{MOD}(Y \times M - 1, MH)$ $AY_{10} = \text{MOD}(Y \times M - 1, MH)$ $AY_{11} = \text{MOD}(Y \times M, MH)$ $AY_{12} = \text{MOD}(Y \times M, MH)$ $AY_{13} = \text{MOD}(Y \times M, MH)$ $AY_{14} = \text{MOD}(Y \times M, MH)$ $AY_{15} = \text{MOD}(Y \times M, MH)$ $AY_{16} = \text{MOD}(Y \times M + 1, MH)$ $AY_{17}=\mathrm{MOD}(Y\times M+1, MH)$ $AY_{18}=\mathrm{MOD}(Y\times M+1, MH)$ $AY_{19}=\mathrm{MOD}(Y\times M+1, MH)$ $AY_{20}=\mathrm{MOD}(Y\times M+1, MH)$ $AY_{21}=\mathrm{MOD}(Y\times M+2, MH)$ $AY_{22}=\mathrm{MOD}(Y\times M+2, MH)$ $AY_{23}=\mathrm{MOD}(Y\times M+2, MH)$ $AY_{24}=\mathrm{MOD}(Y\times M+2, MH)$ $AY_{25}=\mathrm{MOD}(Y\times M+2, MH)$ Next, the weight coefficient table will be described in detail with reference to FIG. 8, FIG. 13, FIG. 14, FIG. 15, FIG. 16 and FIG. 17.

Figure 13:
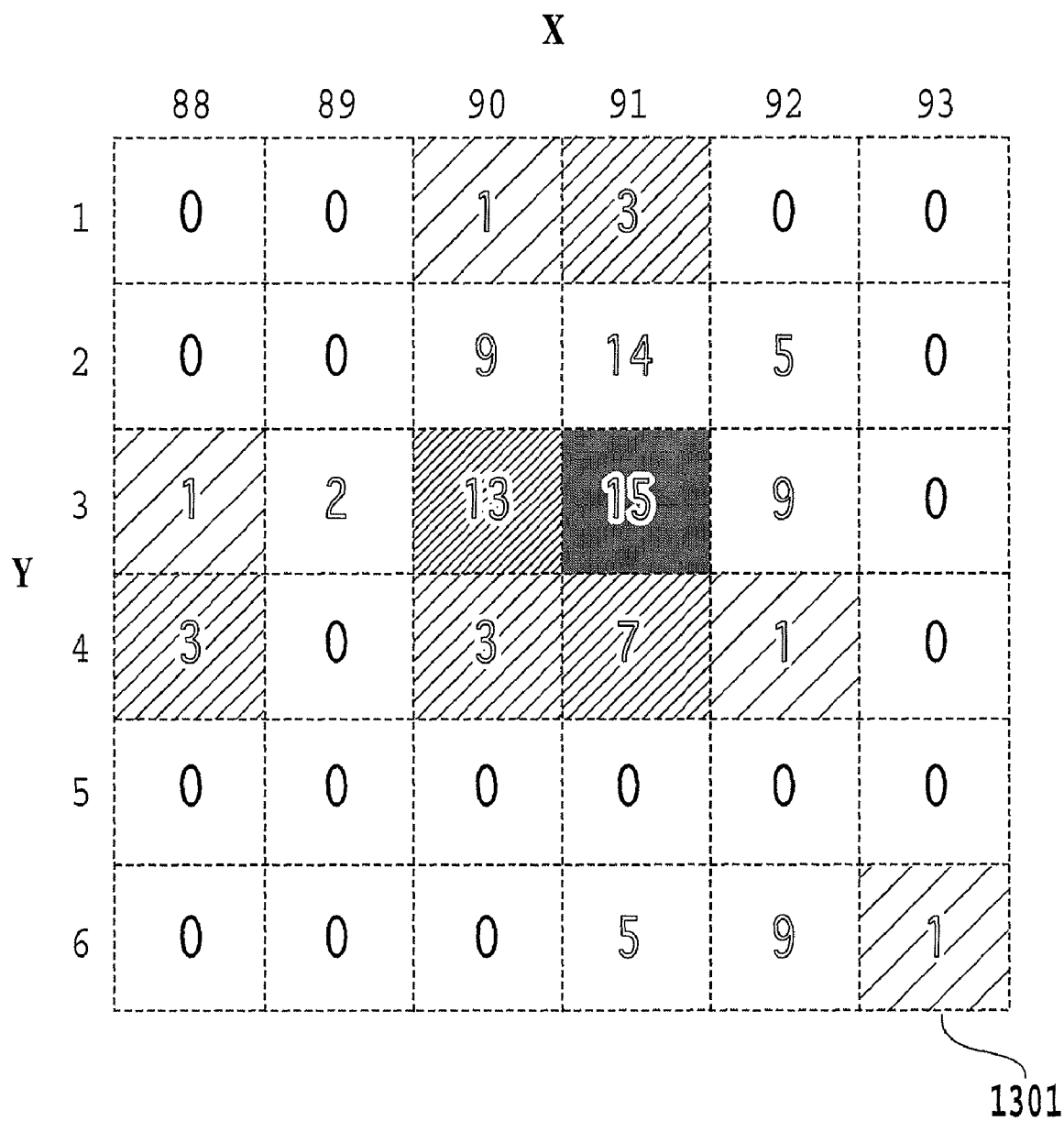
FIG. 13 is an example of processing results of the resolution-enhancing dithering processing in accordance with the present invention.
Figure 14:
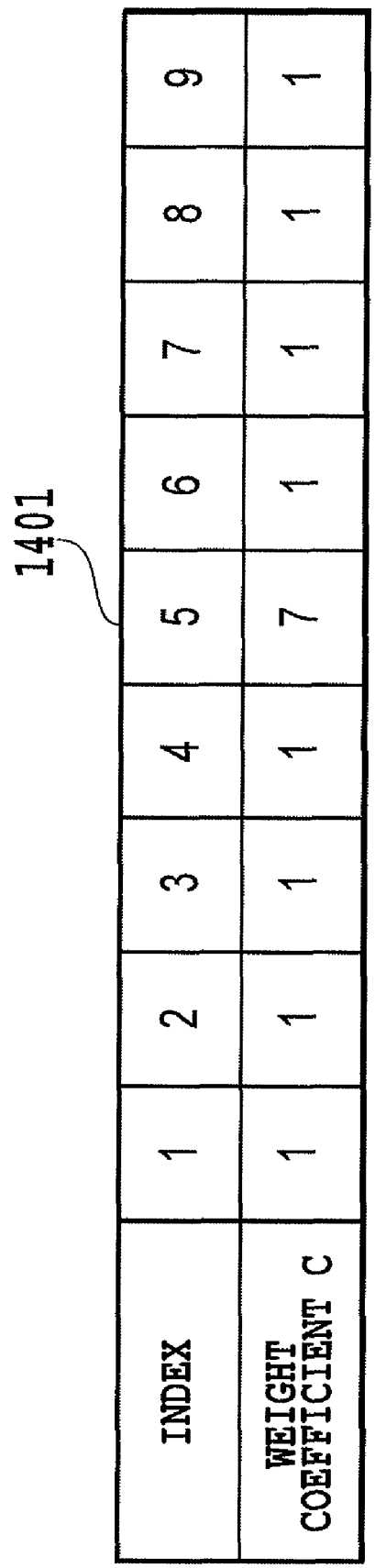
FIG. 14 is an example of a weight coefficient table.
Figure 15:
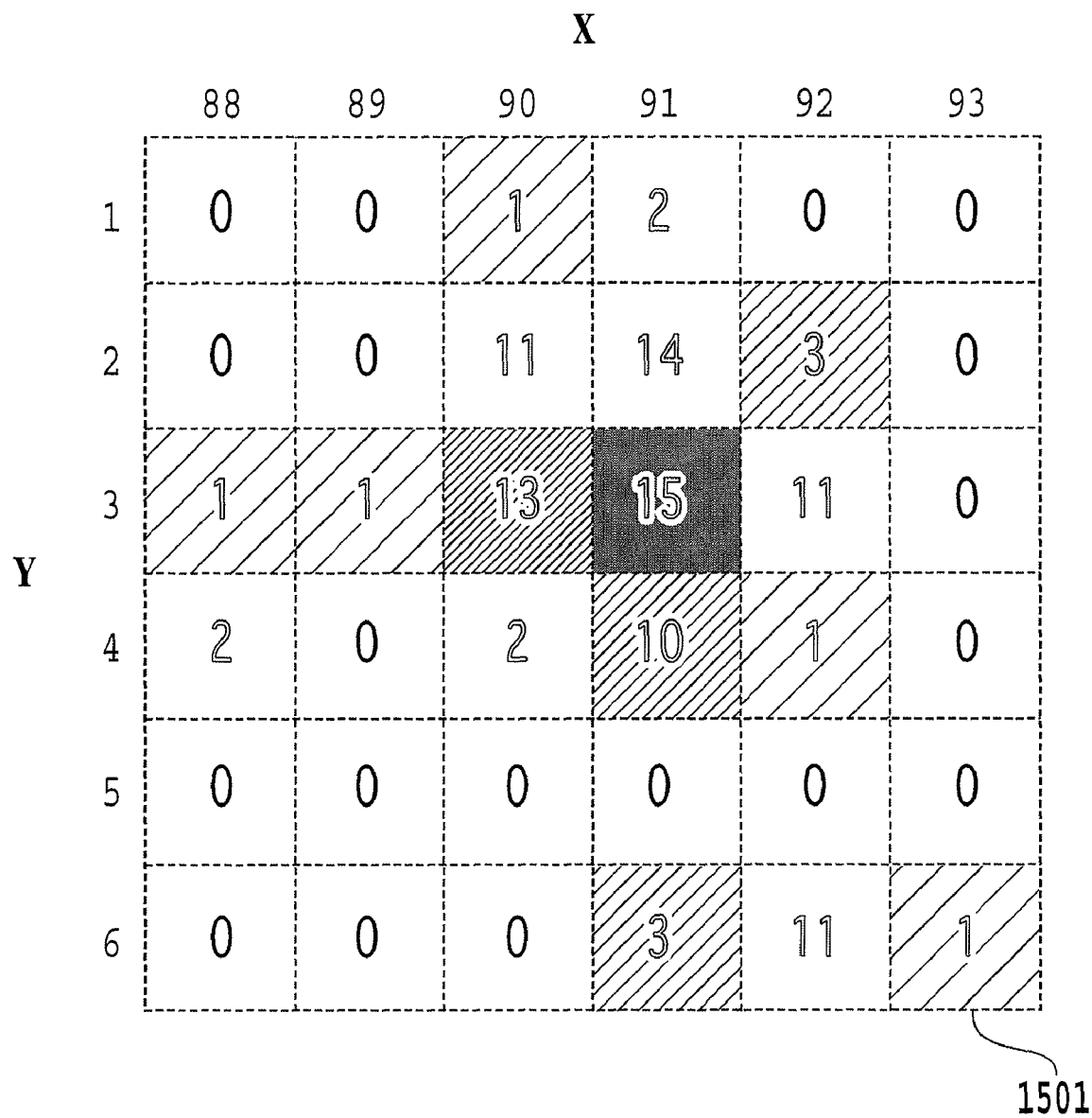
FIG. 15 is an example of processing results of the resolution-enhancing dithering processing in accordance with the present invention.
Figure 16:
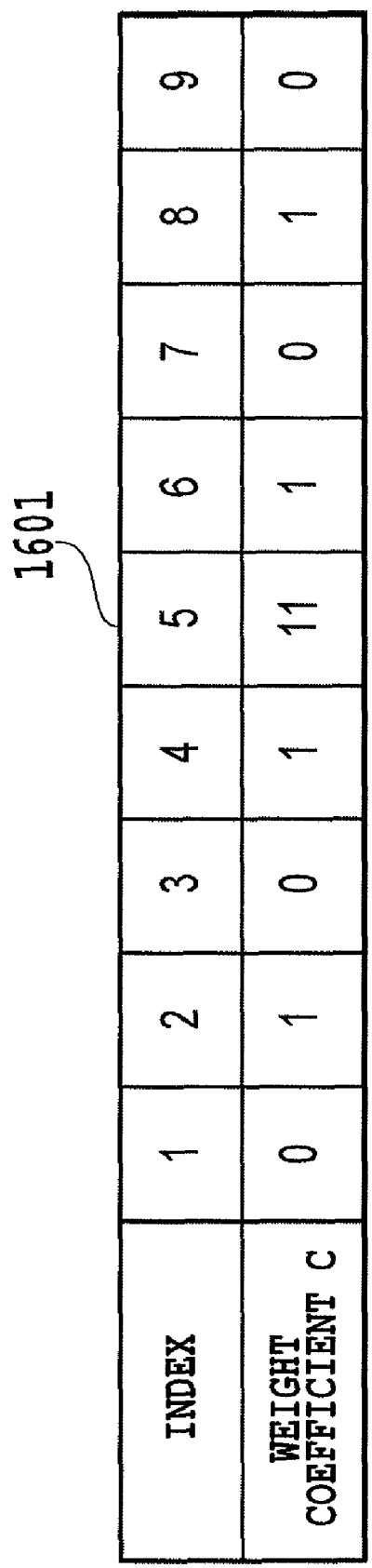
FIG. 16 is an example of a weight coefficient table.
Figure 17:
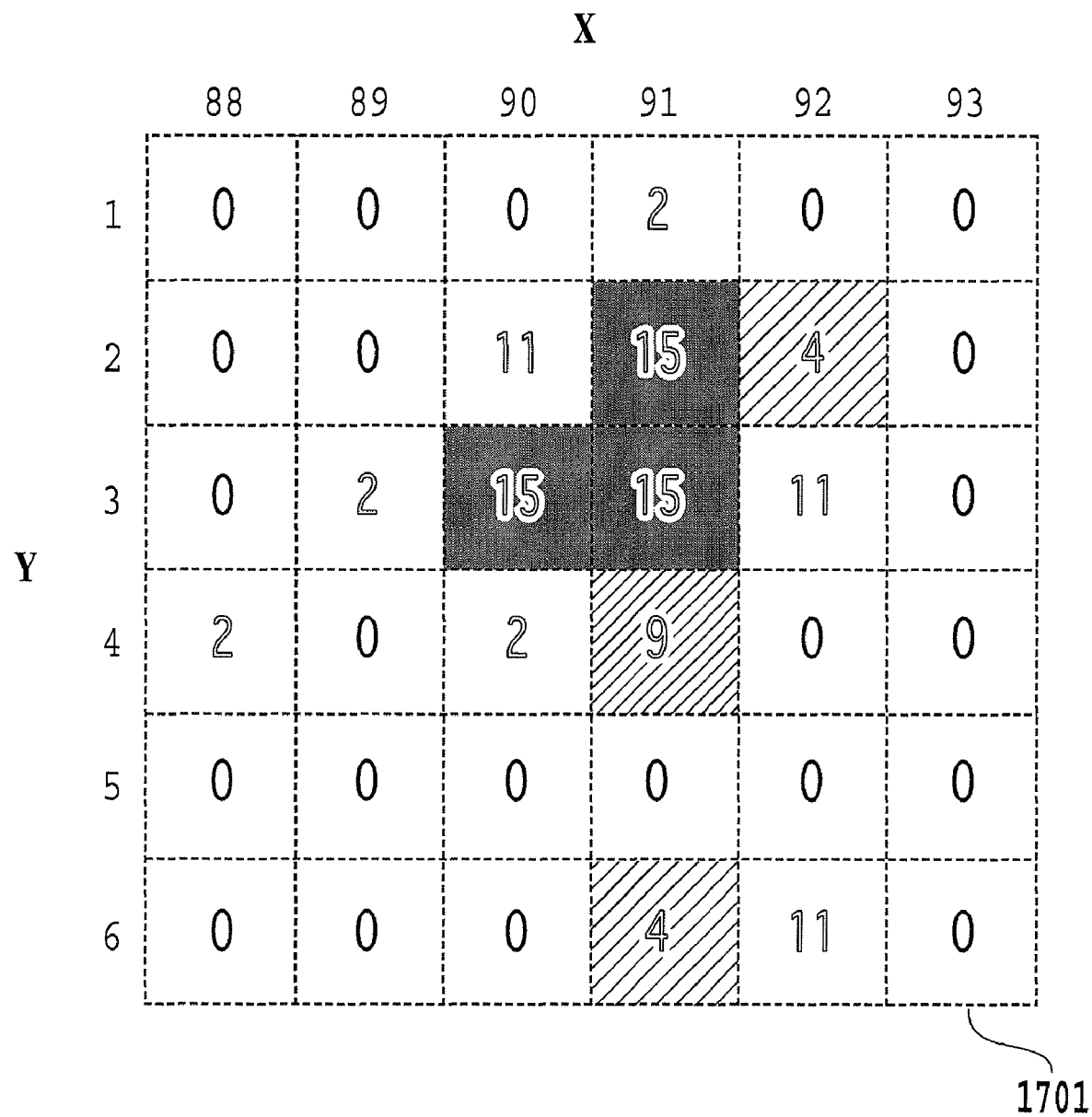
FIG. 17 is an example of processing results of the resolution-enhancing dithering processing in accordance with the present invention.

FIG. 8, FIG. 14 and FIG. 16 each show an example of the weight coefficient table, and FIG. 13, FIG. 15 and FIG. 17 each show an example of the result of the resolution-enhancing dithering processing in the present embodiment.

As described, the weight coefficient table retains by associating the weight coefficients $C_1, C_2, \ldots, C_{NM}$ and indices. In addition, since the sum total of the weight coefficients of the weight coefficient table must be equal to the maximum value of the output pixel value $D_{OUT}$, the sum total of the weight coefficients of the weight coefficient table is set at the maximum number of levels of gray of the output pixel value $D_{OUT}$ in advance. Thus, it is 15 in the present embodiment. The values of the individual weight coefficients in the table can be set arbitrarily as long as they meet the foregoing condition.

FIG. 13 shows the results of applying the resolution-enhancing dithering processing to the range of the image data to be printed 901 of FIG. 10A using the weight coefficient table 801 of FIG. 8. Likewise, FIG. 15 shows the results of carrying out the resolution-enhancing dithering processing using the weight coefficient table 1401, and FIG. 17 shows the results of carrying out the resolution-enhancing dithering processing using the weight coefficient table 1601.

As can be seen from them, the value of the weight coefficient $C_5$ corresponding to the central threshold $Th_5$ in the reference region of the thresholds is made large (maximum) with the values of the weight coefficients corresponding to the other thresholds being made small. This makes it possible to concentrate the form of the halftone dots at its center. As for the weight coefficient table 801 whose central weight coefficient value is not so large relatively though greater than the minimum, it is affected by the neighboring thresholds greater than the other tables 1401 and 1601, which increases the reproducibility of the high resolution dithering matrix 601. To the contrary, as for the weight coefficient table 1601, the effect of the neighboring threshold becomes smaller, and the reproducibility of the high resolution dithering matrix 601 reduces. However, since the halftone dots concentrate more highly, more stable halftone dots are obtained.

The reason for using the weight coefficient table and the dithering table with the foregoing structures in the present embodiment is that it is possible that without using the tables with the foregoing structures, the dithering processing results of the adjacent pixels are nearly the same. For example, assuming that the gray levels of the image are nearly constant, it can occur that the processing result becomes continuity of black, black, black, and black. Thus, the proper function of the dithering processing can be lost such as producing levels of gray by skillfully arranging black and white in a range of the size of the dithering matrix (such as 8×8) by using the dithering matrix when the processing result is binary.

The present embodiment converts the 600-DPI 256-value image to a 16-value image using the 1200-DPI dithering matrix, and prints the 600-DPI 16-value image at 600 DPI. This makes it possible to achieve an image quality as in the case of creating a 1200-DPI 2-value image using the 1200-DPI dithering matrix and printing at 1200 DPI.

Although the resolution of the image data to be printed is 600 DPI in both the main scanning and subscanning directions and the resolution of the dithering matrix is 1200 DPI in both the main scanning and subscanning directions in the present embodiment, the present invention is not so limited. For example, when the resolution of the image data to be printed is 600 DPI in the main scanning and subscanning directions, the resolution of the dithering matrix in the main scanning direction can be 2400 DPI, and the resolution in the subscanning direction can be 1200 DPI. It goes without saying that the processing is performed in this case under the assumption that N=4, M=2, and the number NM is 15, and that the reference region of the thresholds has five thresholds in the main scanning direction and three thresholds in the subscanning direction with the threshold $Th_8$ as the central threshold.

In addition, although the present embodiment constructs the dithering matrix 601 by repeatedly placing the same halftone dot cell 602, this is not essential. For example, it is also possible to employ a dithering matrix using a sub-matrix formed by combining a plurality of halftone dot cells with different thresholds, or a dithering matrix using a super-cell formed by combining a plurality of halftone dot cells with different size.

Embodiment 2

Next, a second embodiment in accordance with the present invention will be described in detail with reference to the drawings.

In the foregoing embodiment 1, the resolution-enhancing dithering processing that employs the dithering method based on the rational tangent method is described. In the present embodiment, the high resolution dithering processing employing the dithering method based on the irrational tangent method will be described. In the present embodiment, the threshold acquiring unit 307 in the halftone processing unit 302 described in the embodiment 1 acquires a plurality of thresholds based on the irrational tangent method. As for the configuration other than that relating to the high resolution dithering processing employing the dithering method based on the irrational tangent method which will be described later, since it is the same as that of the foregoing embodiment 1, its description will be omitted here.

The processing of the halftone processing unit 302 in the present embodiment will now be described in detail with reference to FIG. 18, FIG. 19 and FIG. 20.

It is assumed in the present embodiment that the resolution of the image data to be printed is 600 DPI, and the resolution of the dithering matrix to be applied is double (N=2 and M=2), that is, 1200 DPI as in the embodiment 1.

In addition, the number NM is also assumed to be nine.

First, a dithering matrix used by the present embodiment will be described.

Figure 18:
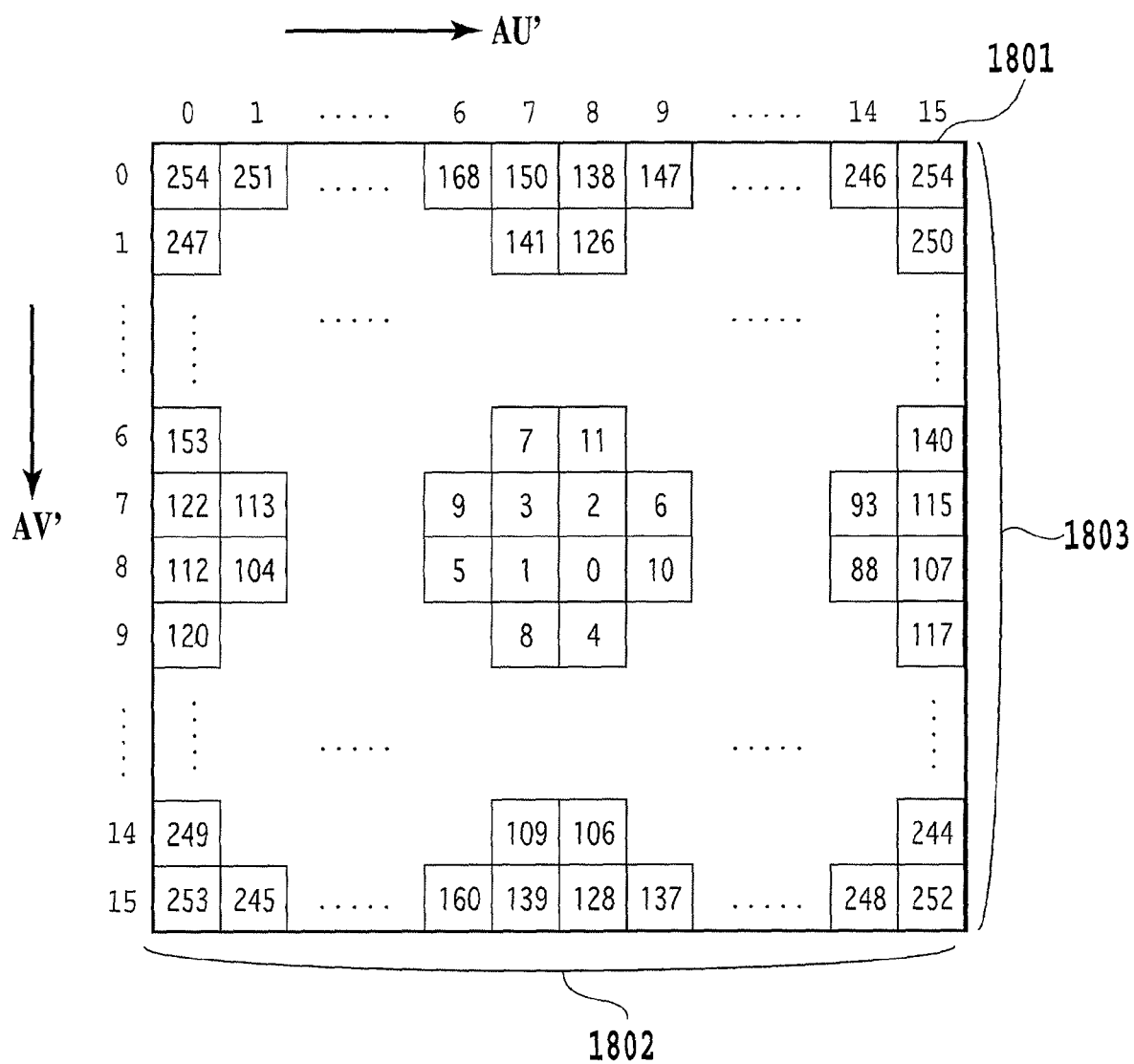
FIG. 18 is an example of a dithering matrix according to an irrational tangent method.

FIG. 18 shows an example of the dithering matrix of the present embodiment. The dithering matrix 1801 is a table having thresholds, each of which represents a single halftone dot, arranged two-dimensionally in gridlike fashion, and has the table length with the width 1802 and the height 1803. Since the image data to be printed is 8-bit deep and takes a value from 0 to 255, the thresholds of the dithering matrix 1801 take a value from 0 to 254.

Figure 19:
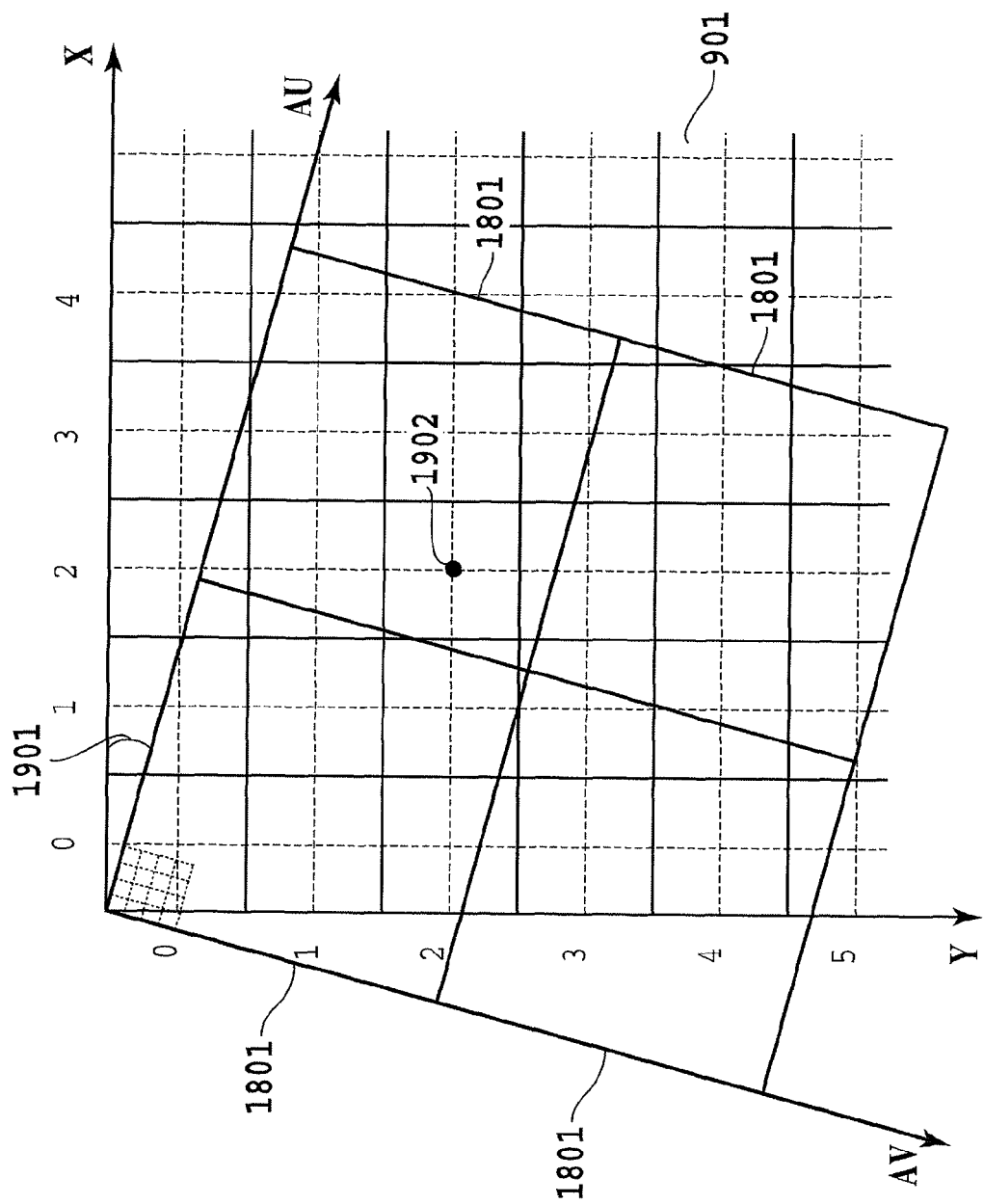
FIG. 19 is a diagram showing relationships between pixels and thresholds in a second embodiment.

FIG. 19 is a diagram showing the relationships between the image data to be printed and the dithering matrix based on the irrational tangent method. The X axis and Y axis of FIG. 19 represent the coordinates of the image data to be printed 901 in the main scanning direction and subscanning direction, and the AU axis and AV axis represent the address coordinates of the dithering matrix 1801. The dithering matrix 1801 and its AU-AV coordinate system is rotated through a screen angle 1901 with respect to the image data to be printed 901 and its X-Y coordinate system.

Next, the resolution-enhancing dithering processing method in the present embodiment will be described with reference to FIG. 20.

Figure 20:
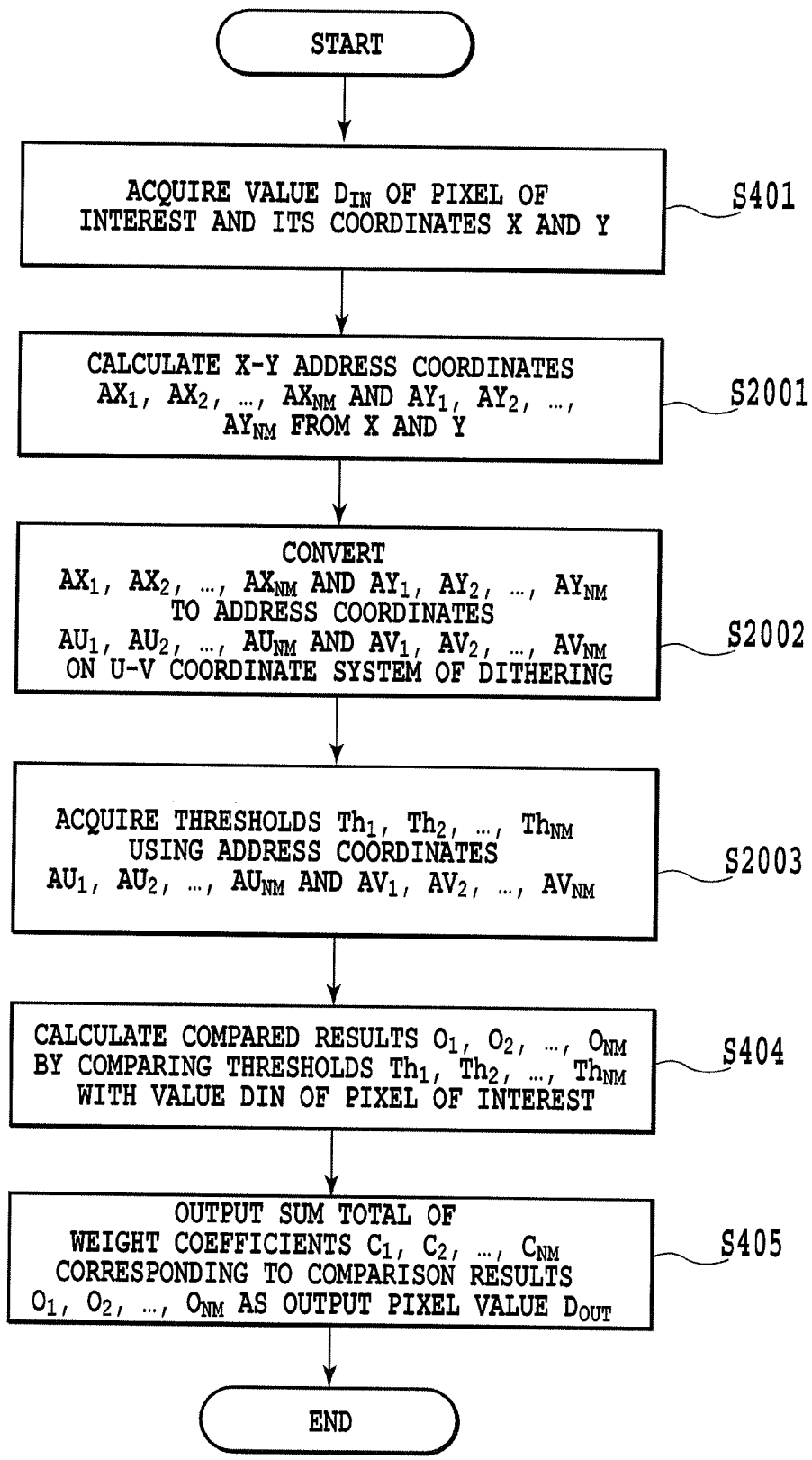
FIG. 20 is a flowchart of the resolution-enhancing dithering processing in the second embodiment.

FIG. 20 is a flowchart showing the resolution-enhancing dithering processing method in the present embodiment. In FIG. 20, the same processing steps as those in the flowchart of FIG. 4 are designated by the same reference numerals.

First, at step S401, as for a pixel of interest 2401, its value $D_{IN}$, its coordinate X in the main scanning direction and its coordinate Y in the subscanning direction are acquired as described in the embodiment 1.

Next, at step S2001, the threshold acquiring unit 307 obtains the nine address coordinates of the image data to be printed on the X-Y coordinate system. The address coordinates are nine values $AX_1, AX_2, \ldots, AX_{NM}$ in the main scanning direction, and nine values $AY_1, AY_2, \ldots, AY_{NM}$ in the subscanning direction. In the present embodiment, since the number NM is 9, the address coordinates in the main scanning direction are up to $AX_9$, and the address coordinates in the subscanning direction are up to $AY_9$. Details of the calculation method of the address coordinates on the X-Y coordinate system will be described later.

Next, at step S2002, the threshold acquiring unit 307 obtains the address coordinates $AU_1, AU_2, \ldots, AU_{NM}$ and $AV_1, AV_2, \ldots, AV_{NM}$ on the U-V coordinate system of the dithering matrix 1801. Assume that the address coordinates on the ith X-Y coordinate system are $AX_i$ and $AY_i$, and the address coordinates converted to those on the U-V coordinate system corresponding to them are $AU_i$ and $AV_i$, the conversion can be carried out by the following expression.

$$AU_i = (AX_i \times \cos\theta + AY_i \times \sin\theta) \times pw$$

$$AV_i = (-AX_i \times \sin\theta + AY_i \times \cos\theta) \times ph$$

$$pw = MW/(R_{Dither}/L)$$

$$ph = MH/(R_{Dither}/L)$$

In this case, pw is an address coordinate conversion value in the AU direction, ph is an address coordinate conversion value in the AV direction, MW is the width 1802 of the dithering matrix 1801, MH is the height 1803 thereof, $R_{Dither}$ is the resolution of dithering, θ is the screen angle of the dithering, and L is the number of screen lines of the dithering. For example, when the number of screen lines L is 133 lpi (lines per inch), the screen angle θ is 15 degrees, and the width MW and the height MH are both 15, both pw and ph become about 1.66.

Next, at step S2003, the threshold acquiring unit 307 obtains the nine thresholds $Th_1, Th_2, \ldots, Th_{NM}$ from the address coordinates $AU_1, AU_2, \ldots, AU_{NM}$ and $AV_1, AV_2, \ldots, AV_{NM}$ and the dithering matrix 1801. On the address coordinate system U-V, the dithering matrix 1801 is repeatedly arranged like tiles with the width 1802 and the height 1803 as shown in FIG. 19. Accordingly, the address coordinates $AU_i'$ and $AV_i'$ of the ith threshold $Th_i$ are obtained in the dithering matrix 1801 as follows.

$$AU_i' = \text{MOD}(\text{INT}(AU_i), MW)$$

$$AV_i' = \text{MOD}(\text{INT}(AV_i), MH)$$

Here, MOD represents a function of a module operation, which returns the remainder left when the first argument is divided by the second argument, and INT represents the operation of giving the whole number part by rounding down the fractional part. In other words, as shown by the foregoing expressions, the coordinates equal to the remainders left when the whole number parts of the address coordinates are divided by the width MW and the height MH of the dithering matrix correspond to the lattice point of the dithering matrix 1801, and the threshold $Th_i$ is acquired from the lattice point.

Next, at step S404, as described before in embodiment 1, the comparing unit 308 compares the value $D_{IN}$ of the pixel of interest 2401 acquired at step S401 with the nine thresholds 2402, $Th_1, Th_2, \ldots, Th_{NM}$, acquired at step S403, respectively. As a result of the comparison, if the value of the pixel of interest 2401 is greater than the threshold, it assigns "1" and otherwise it assigns "0", and outputs them as 1-bit comparison decision results 2403, $O_1, O_2, \ldots, O_{NM}$, each of which corresponds to one of the nine thresholds.

Finally, step S405 is executed. The integrating unit 309 obtains the value $D_{out}$ of the output pixel 2405 corresponding to the pixel of interest 2401 from the comparison results 2403 obtained at step S404 and from the weight coefficients 2404, $C_1, C_2, \ldots, C_{NM}$, corresponding to the comparison results $O_1, O_2, \ldots, O_{NM}$, respectively. The weight coefficients 2404, $C_1, C_2, \ldots, C_{NM}$, are acquired from the weight coefficient table 801, 1401 or 1601 shown in FIG. 8, FIG. 14 or FIG. 16 as described in the embodiment 1.

Next, a calculation method of the address coordinates on the X-Y coordinate system will be described in detail with reference to FIG. 19, FIG. 21, FIG. 22 and FIG. 23.

Figure 21:
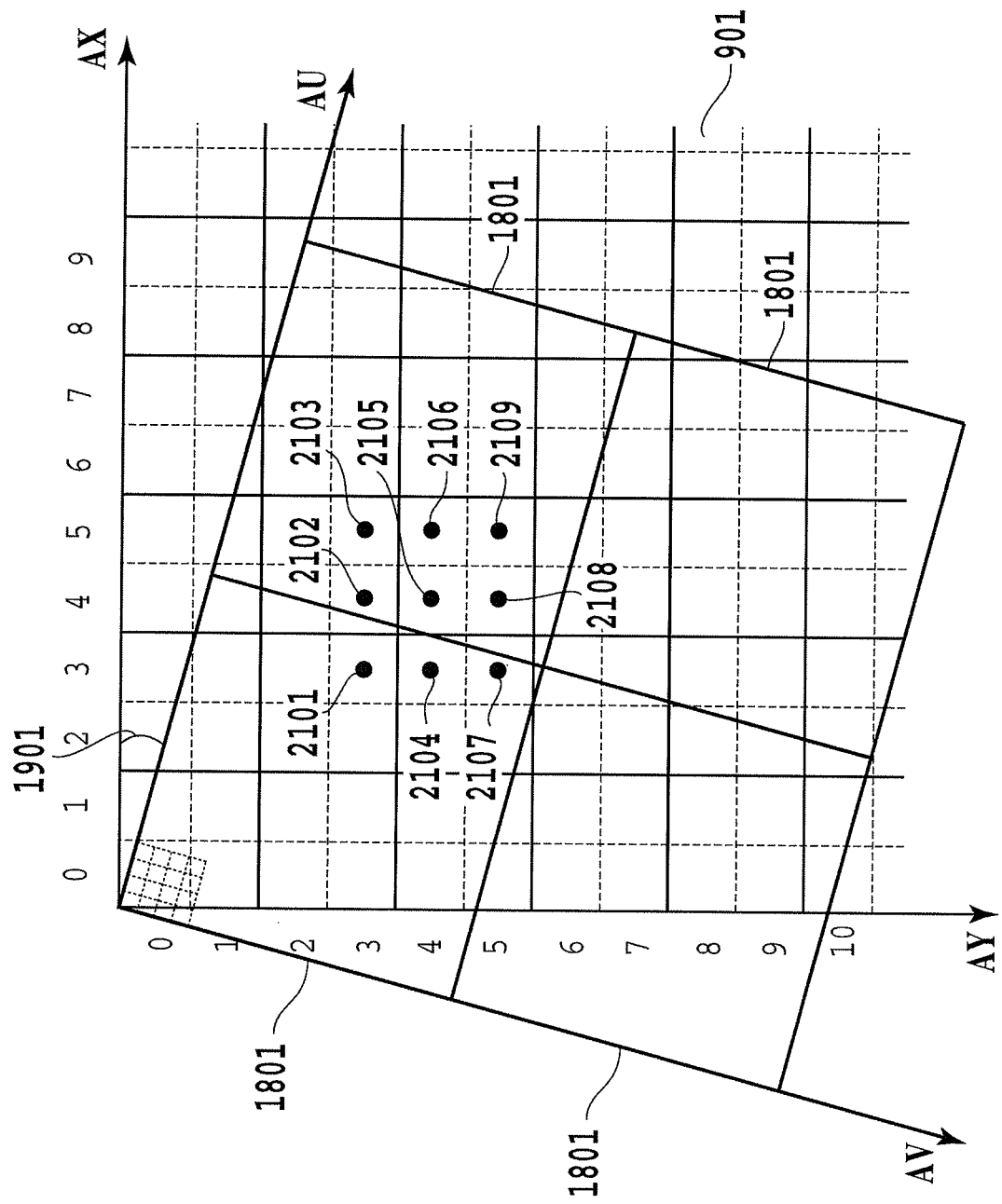
FIG. 21 is a diagram showing relationships between pixels and thresholds in the second embodiment.
Figure 22:
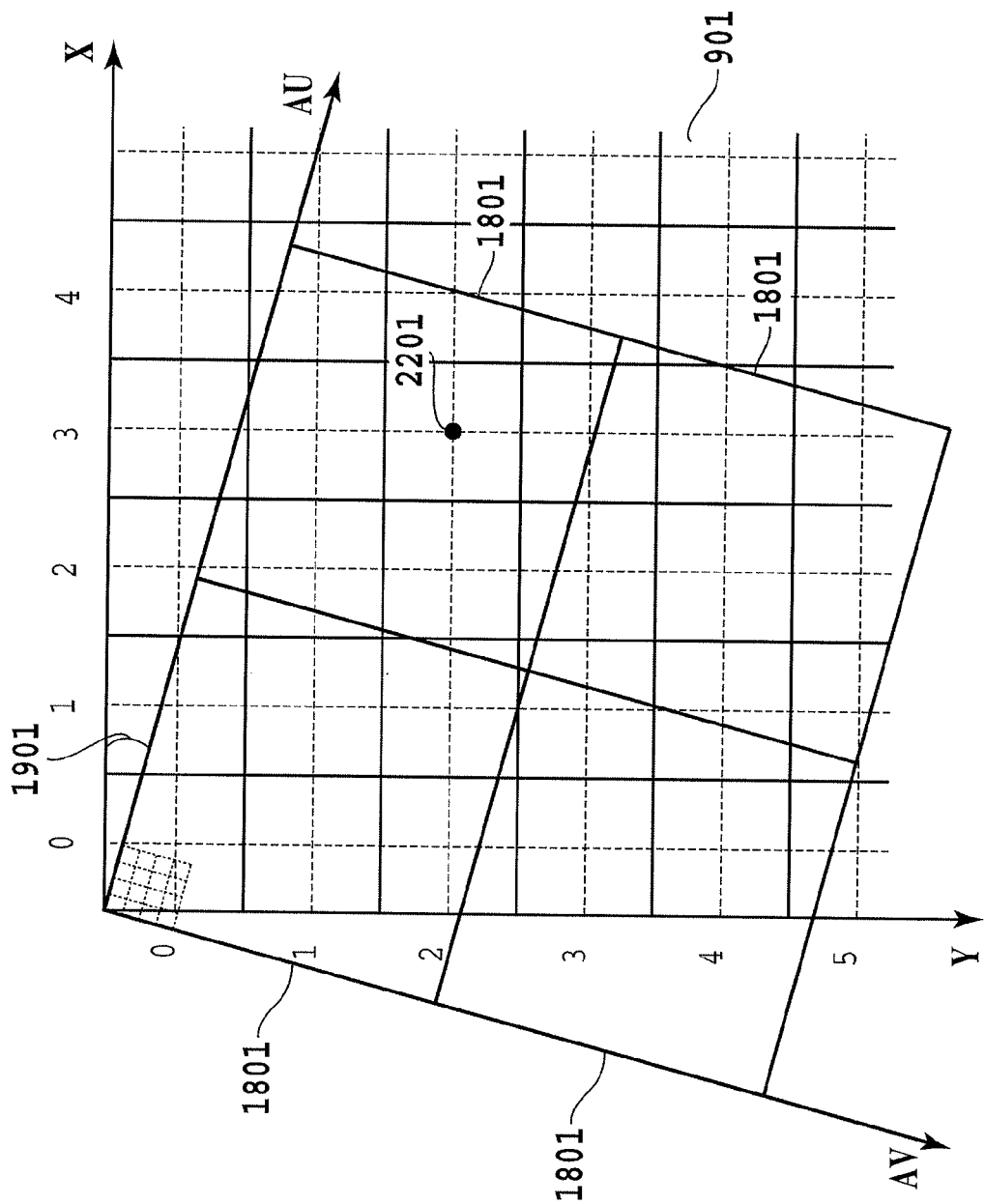
FIG. 22 is a diagram showing relationships between pixels and thresholds in the second embodiment.
Figure 23:
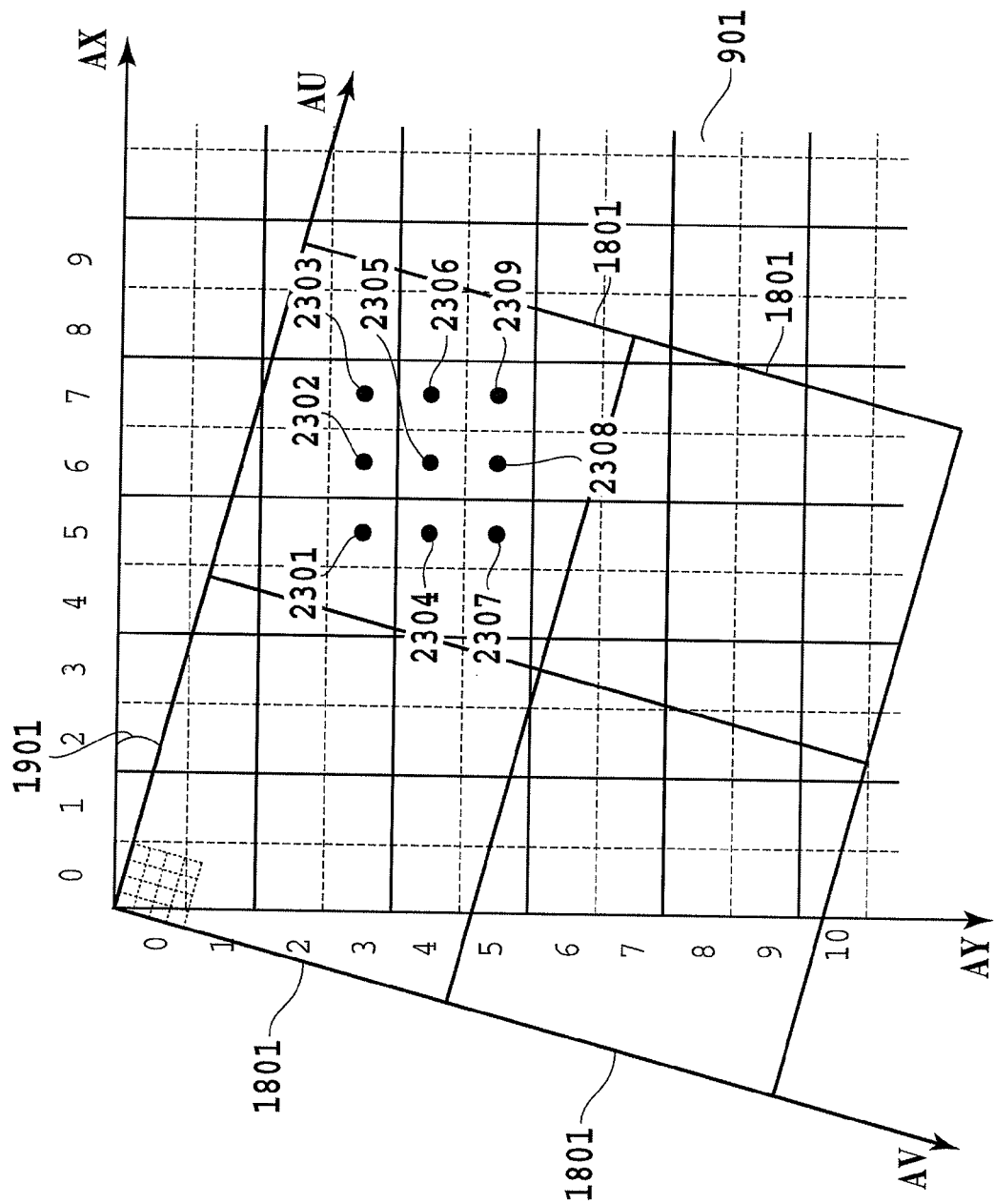
FIG. 23 is a diagram showing relationships between pixels and thresholds in the second embodiment.

FIG. 19, FIG. 21, FIG. 22 and FIG. 23 are diagrams showing the relationships between the image data to be printed and the dithering matrix based on the irrational tangent method. FIG. 19 and FIG. 22 show the relationships between the coordinates X and Y and the U-V coordinate system; and FIG. 21 and FIG. 23 show the relationships between the coordinates AX and AY and the U-V coordinate system.

The address coordinates $AX_1, AX_2, \ldots, AX_9$ and $AX_1, AX_2, \ldots, AY_9$ of the nine thresholds in the present embodiment are obtained from the coordinate X and coordinate Y of the pixel of interest by the following expression.

$$AX_1 = X \times N - 1$$

$$AX_2 = X \times N$$

$$AX_3 = X \times N + 1$$

$$AX_4 = X \times N - 1$$

$$AX_5 = X \times N$$

$$AX_6 = X \times N + 1$$

$$AX_7 = X \times N - 1$$

$$AX_8 = X \times N$$

$$AX_9 = X \times N + 1$$

$AY_1 = Y \times M - 1$ $AY_2 = Y \times M - 1$ $AY_3 = Y \times M - 1$ $AY_4 = Y \times M$ $AY_5 = Y \times M$ $AY_6 = Y \times M$ $AY_7 = Y \times M + 1$ $AY_8 = Y \times M + 1$ $AY_9 = Y \times M + 1$ When the pixel of interest having the value $D_{IN}$ in FIG. 19 has the coordinates (2, 2) of a pixel 1902, the coordinates of the thresholds $Th_1$, $Th_2$, $Th_3$, ..., $Th_9$ are given by the reference numerals 2101, 2102, 2103, 2104, 2105, 2106, 2107, 2108, 2109 of FIG. 21. The coordinate values ($AY_j$, $AY_i$) on the X-Y coordinate system are (3, 3), (3, 4), (3, 5), (4, 3), (4, 4), (4, 5), (5, 3), (5, 4), (5, 5) from the foregoing expressions.

On the other hand, when the pixel of interest having the value $D_{IN}$ in FIG. 22 has the coordinates (2, 3) of a pixel 2201, the coordinates of the thresholds $Th_1$, $Th_2$, $Th_3$, ..., $Th_9$ are given by the reference numerals 2301, 2302, 2303, 2304, 2305, 2306, 2307, 2308, 2309 of FIG. 23. The coordinate values ($AY_j$, $AY_i$) on the X-Y coordinate system are (3, 5), (3, 6), (3, 7), (4, 5), (4, 6), (4, 7), (5, 5), (5, 6), (5, 7) from the foregoing expressions.

As can be seen from the coordinate values, some of the coordinates of the thresholds ((3, 5), (4, 5), (5, 5)) on the X-Y coordinate system are common to FIG. 21 and FIG. 23. In this way, when each pixel of the image data to be printed 901 becomes the pixel of interest, the present embodiment also carries out the processing using the same thresholds as not all but some of the thresholds of the dithering matrix 1801 the adjacent neighboring pixels refer to. Using the dithering matrix 1801 makes it possible to implement the multilevel dithering method easily while achieving the high image quality by applying the high resolution dithering to the low resolution input image. In addition, since the present embodiment carries out the dithering processing by using the dithering matrix 1801 repeatedly, it can realize the memory-saving low cost dithering method as the embodiment 1.

The above is the description of the embodiments in accordance with the present invention.

The object of the present invention can be achieved by reading, from a storage medium that stores program code for implementing the procedures of the flowcharts shown in the embodiments described above, the program code and executing it with a computer (or CPU or MPU) of the system or device.

In this case, the program code itself read from the storage medium implements the functions of the foregoing embodiments. Accordingly, the program code and a computer readable storage medium that stores the program code constitute the present invention.

As the storage medium for supplying the program code, a floppy (registered trademark) disk, hard disk, optical disk, magneto-optical disk, CD-ROM, CD-R, magnetic tape, non-volatile memory card, ROM and the like can be used.

The functions of the foregoing embodiments can be achieved by a computer executing the program code. In addition, the term "execution of the program" includes the case where an OS and the like of a computer performs part or all of the actual processing according to the instructions of the program code.

Furthermore, the functions of the foregoing embodiments can also be implemented by a function expansion board inserted into a computer or a function expansion unit connected to the computer. In this case, the program read out of the storage medium is written into a memory in the function expansion board inserted into the computer or in the function expansion unit connected to the computer. After that, according to the instructions of the program, the CPU in the expansion board or in the expansion unit performs part or all of the actual processing. The functions of the foregoing embodiments can also be implemented by such a function expansion board or a function expansion unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-026710, filed Feb. 6, 2008, which is hereby incorporated by reference herein in its entirety.

What is claimed is:

1. An image processing device configured to retain a high resolution dithering matrix, the image processing device comprising:
    a comparing unit constructed to compare a pixel value included in each pixel of a low resolution input image with a plurality of thresholds included in the high resolution dithering matrix;
    an obtaining unit constructed to obtain a multi-level gray scale signal value for each pixel by multiplying each of a plurality of comparison results obtained for each of the pixels by a coefficient and adding up the plurality of values obtained by the multiplication; and
    an output unit constructed to output the multi-level gray scale signal values obtained by the obtaining unit,
    wherein a threshold which is in a plurality of thresholds compared with the pixel value included in a first pixel of the low resolution input image and whose comparison result is multiplied with the maximum coefficient does not agree with a threshold which is in a plurality of thresholds compared with the pixel value included in a second pixel of the low resolution input image and whose comparison result is multiplied with the maximum coefficient; and
    wherein a threshold which is in the plurality of thresholds compared with the pixel value included in the first pixel of the low resolution input image and whose comparison result is multiplied with the minimum coefficient agrees with a threshold which is in the plurality of thresholds compared with the pixel value included in the second pixel of the low resolution input image and whose comparison result is multiplied with the minimum coefficient.

2. The image processing device as claimed in claim 1, wherein all of a plurality of thresholds compared with the pixel value included in a first pixel of the low resolution input image do not agree with all of a plurality of thresholds compared with the pixel value included in a second pixel of the low resolution input image; and
    at least one of the plurality of thresholds compared with the pixel value included in the first pixel of the low resolution input image agrees with at least one of the plurality of thresholds compared with the pixel value included in the second pixel of the low resolution input image.

3. The image processing device as claimed in claim 1, wherein the total sum of the coefficients to be multiplied by the plurality of comparison results obtained for each of the pixels is determined in advance in accordance with levels of gray expressible by a printing engine unit connected to the image processing device.

4. The image processing device as claimed in claim 3, wherein the maximum coefficient in the coefficients multiplied with each of the plurality of comparison results obtained for each pixel is greater than the minimum coefficient.

5. An image processing method configured to execute a dithering processing in an image processing device retaining a high resolution dithering matrix, the image processing method comprising the step of:

- comparing a pixel value included in each pixel of a low resolution input image with a plurality of thresholds included in the high resolution dithering matrix;
- obtaining a multi-level gray scale signal value for each pixel by multiplying each of a plurality of comparison results obtained for each of the pixels by a coefficient and adding up the plurality of values obtained by the multiplication; and
- outputting the multi-level gray scale signal values obtained by the obtaining step,
- wherein a threshold which is in a plurality of thresholds compared with the pixel value included in a first pixel of the low resolution input image and whose comparison result is multiplied with the maximum coefficient does not agree with a threshold which is in a plurality of thresholds compared with the pixel value included in a second pixel of the low resolution input image and whose comparison result is multiplied with the maximum coefficient; and
- wherein a threshold which is in the plurality of thresholds compared with the pixel value included in the first pixel of the low resolution input image and whose comparison result is multiplied with the minimum coefficient agrees with a threshold which is in the plurality of thresholds compared with the pixel value included in the second pixel of the low resolution input image and whose comparison result is multiplied with the minimum coefficient.

* * * * *